(12) United States Patent
Melson et al.

(10) Patent No.: US 6,594,958 B2
(45) Date of Patent: Jul. 22, 2003

(54) BUILDING FOR CONTAINING HUMAN OCCUPANTS IN AN ADVERSE ARCTIC OR ANTARCTIC ENVIRONMENT AND STRUCTURES FOR CONTAINING AND PROTECTING OCCUPANTS IN AN ADVERSE ENVIRONMENT

(75) Inventors: Sabine Melson, Mainz (DE); Stefan Hubert, Engelstadt (DE); Thomas Karschti, Burdenheim (DE)

(73) Assignee: Schott Glas, Mainz (DE)

(*) Notice: Subject to any disclaimer, the term of this patent is extended or adjusted under 35 U.S.C. 154(b) by 0 days.

(21) Appl. No.: 09/828,287

(22) Filed: Apr. 6, 2001

(65) Prior Publication Data

US 2002/0011033 A1 Jan. 31, 2002

(30) Foreign Application Priority Data

Apr. 8, 2000 (DE) .......................................... 100 17 699

(51) Int. Cl.⁷ ........................... E04B 1/12; E04H 15/00; E04H 15/18
(52) U.S. Cl. ............................... 52/63; 52/80.1; 52/82; 52/81.1; 219/465.1; 219/203
(58) Field of Search ................................. 52/79.1, 80.1, 52/82, 84, DIG. 10, 81.1, 745.19, 656.1, 745.02, 745.13, 745.09, 63; 219/465.1, 547, 203

(56) References Cited

U.S. PATENT DOCUMENTS

| | | | | |
|---|---|---|---|---|
| 4,996,105 A | * | 2/1991 | Oyama et al. ............... 428/336 |
| 5,496,640 A | * | 3/1996 | Bolton et al. ............... 428/421 |
| 5,649,395 A | * | 7/1997 | Durham ....................... 52/173.3 |
| 5,958,272 A | * | 9/1999 | Taplan et al. ............. 219/445.1 |
| 5,988,566 A | * | 11/1999 | Meyer ....................... 244/129.3 |
| 6,060,168 A | * | 5/2000 | Kohli ........................... 428/428 |
| 6,114,664 A | * | 9/2000 | Cook et al. ................. 219/400 |
| 6,138,663 A | * | 10/2000 | Nomura et al. ............. 126/190 |
| 6,148,812 A | * | 11/2000 | Taplan et al. .............. 126/39 J |
| 6,492,622 B2 | * | 12/2002 | Melson et al. .............. 126/211 |

FOREIGN PATENT DOCUMENTS

| | | |
|---|---|---|
| DE | 2559556 | 4/1977 |
| DE | 2826261 | 1/1979 |
| DE | 4417496 | 11/1995 |
| DE | 19729336 | 1/1999 |
| JP | 6056486 | 3/1994 |

* cited by examiner

Primary Examiner—Carl D. Friedman
Assistant Examiner—Chi Q. Nguyen
(74) Attorney, Agent, or Firm—Nils H. Ljungman & Associates

(57) ABSTRACT

A building for containing occupants, with at least one covering element to provide at least one roof portion, at least one wall portion, and at least one floor portion, to provide an interior space to contain and protect occupants from an adverse environment about the building or other structures. The building has an opening to permit occupants to ingress and egress, a window comprising at least one pane, comprising at least an outer pane disposed to contact the adverse environment about the building and at least one inner pane disposed toward the interior space of the building. The pane exposed to the environment about the building or structure comprises a glass material that has a minimized coefficient of thermal expansion. The building also has an insulation to protect occupants from adverse temperature and environmental conditions about the building and a heating apparatus to provide heat to the space provided by the at least one covering element, the window, and the insulation.

24 Claims, 6 Drawing Sheets

BUILDING FOR CONTAINING HUMAN OCCUPANTS IN AN ADVERSE ARCTIC OR ANTARCTIC ENVIRONMENT AND STRUCTURES FOR CONTAINING AND PROTECTING OCCUPANTS IN AN ADVERSE ENVIRONMENT

BACKGROUND OF THE INVENTION

1. Field of the Invention

This invention relates to a building for containing human occupants in an adverse arctic or antarctic environment that are closed with respect to an environment, such as in polar regions, and that are exposed during operation to an extremely high temperature gradient, such as in polar stations in Arctic and/or Antarctic latitudes. The invention also relates to structures for containing occupants in an adverse environment that are closed with respect to an environment, such as in polar regions and that are exposed during operation to an extremely high temperature gradient, such as in polar stations in Arctic and/or Antarctic latitudes. The invention also relates to a building for containing human occupants in an adverse environment with glazing that are closed with respect to an environment, such as in polar regions, and that are exposed during operation to an extremely high temperature gradient, in particular for use as windows in polar stations in Arctic and/or Antarctic latitudes. The invention also relates to the glazing of structures that are closed with respect to an environment, such as in space, that are exposed during operation to an extremely high temperature gradient, in particular for use as windows in space stations, space vehicles, and missiles. The invention also relates to structures that are closed with respect to an environment, such as extremely high altitudes, that are exposed during operation to an extremely high temperature gradient, in particular for use as windows in airplanes, aircraft, or other vehicles being exposed to extreme temperature gradients.

2. Background of the Invention

Materials that are used in buildings for containing occupants in an adverse environment and structures for containing and protecting occupants in adverse environments, act as a barrier to adverse temperature, and pressure and thus must meet special requirements.

In buildings for containing occupants in an adverse environment and structures for containing and protecting occupants in adverse environments, as a result of atmospheric conditions which include, for example, direct solar radiation on one side while the other side is in shadow, there are extreme temperature differences. High temperature stresses can also be exerted by hot or cold air conditions. Local changes, such as rapid temperature changes, can also result in high temperature gradients across a window in a building. If inappropriate materials are used, stresses can occur that can lead to the failure of the building and/or a building's window.

Temperature gradients also occur between the temperatures of the environments that are separated by the window. In this case, a temperature gradient or difference over the thickness of the window of −250° C. or +120° C., for example, can occur between the temperature of the structure (20° C.) and the temperature in the environment.

Temperature gradients that are not that extreme but that can nevertheless produce high thermo-mechanical stress on the glazing occur on the windows of stations in the Arctic and the Antarctic.

There is an additional factor that has to be taken into consideration in glazing for applications. The materials used must have sufficient hardness and mechanical strength.

In general the glazing, i.e. the window, must allow a distortion-free view and must be easy to clean.

Materials that are used as windows in space stations or missiles as a barrier to the adverse temperature and pressure atmospheric conditions in space must meet special requirements.

As a result of atmospheric conditions, which include, for example, direct solar radiation on one side while the other side is in shadow, there are extreme temperature differences of $\Delta T \approx 370$ K (sun side: +120° C., shadow side: −250° C.). High temperature stresses can also be exerted by hot or cold gas streams from missiles being launched, landing or flying past. Local changes, such as rotations or rapid temperature changes, can also result in high temperature gradients across a window. If inappropriate materials are used, stresses can occur that can lead to the failure of the window.

Temperature gradients also occur between the temperatures of the environments that are separated by the window, e.g. the inside of the space station or spacecraft and space. In this case, a temperature gradient or difference over the thickness of the window of −250° C. or +120° C., for example, can occur between the temperature of the space station (20° C.) and the temperature in space.

Temperature gradients that are not that extreme but that can nevertheless produce high thermo-mechanical stress on the glazing occur on the windows of stations in the Arctic and the Antarctic.

There is an additional factor that has to be taken into consideration in glazing for applications in space.

Because the atmosphere can contain abrasive media, e.g. sand, dust, small meteorites, space junk etc., the materials used must have sufficient hardness and mechanical strength.

In general the glazing, i.e. the window, must allow a distortion-free view and must be easy to clean.

Materials that are used as windows in aircraft as a barrier to the adverse temperature and pressure in the environment must meet special requirements.

In aircraft, such as airplanes which fly at high and more often at extremely high altitudes, as a result of atmospheric conditions which include, for example, direct solar radiation on one side while the other side is in shadow, there are extreme temperature differences. High temperature stresses can also be exerted by hot or cold air conditions. Local changes, such rapid temperature changes, can also result in high temperature gradients across a window. If inappropriate materials are used, stresses can occur that can lead to the failure of the window.

Temperature gradients also occur between the temperatures of the environments that are separated by the window. In this case, a temperature gradient or difference over the thickness of the window of −250° C. or +120° C., for example, can occur between the temperature of the aircraft (20° C.) and the temperature in the environment.

Temperature gradients that are not that extreme but that can nevertheless produce high thermo-mechanical stress on the glazing occur on the windows of stations in the Arctic and the Antarctic.

There is an additional factor that has to be taken into consideration in glazing for applications. The materials used must have sufficient hardness and mechanical strength.

In general the glazing, i.e. the window, must allow a distortion-free view and must be easy to clean.

OBJECT OF THE INVENTION

The object of the invention is to create an effective glazing for buildings that are enclosed with respect to the environment in polar regions and that are exposed to an extremely high temperature gradient during operation.

Another object of the invention is to create an effective glazing for space stations and space vehicles that are enclosed with respect to the environment in space and that are exposed to an extremely high temperature gradient during operation.

Another object of the invention is to create an effective glazing for aircraft that are enclosed with respect to the environment in the air and that are exposed to an extremely high temperature gradient during operation.

SUMMARY OF THE INVENTION

The invention teaches a building for containing human occupants in an adverse Arctic or Antarctic environment, said building comprising: at least one covering element to provide at least one roof portion, at least one wall portion, and at least one floor portion, to provide an interior space to contain and protect occupants from an adverse environment about the building; the at least one covering element being configured to provided protection to occupants in an adverse Arctic or Antarctic environment; an opening to permit occupants to ingress into and egress from the building; an apparatus to close the opening from the outside environment; a window comprising a frame and at least one pane disposed in the frame; the window being configured to protect occupants from an adverse Arctic or Antarctic environment; the at least one pane comprising at least one outer pane disposed to contact the adverse environment about the building and at least one inner pane disposed toward the interior space of the building; the at least one outer pane comprising an outer surface disposed to contact the adverse environment and an inner surface facing toward the at least one inner pane; the pane exposed to the environment about the building comprising a transparent glass material; the glass material having a coefficient of thermal expansion that is minimized such that the glass material of the at least one outer pane is configured to withstand extreme temperature gradients from the outer surface to the inner surface of the at least one outer pane; at least the outer surface of the at least one outer pane being configured to have a surface roughness which is minimized, thus providing a view through the at least one pane having a distortion which is minimized and providing an easy-to-clean outer surface; the glass material being substantially free of pits and pores on at least the outer and the inner surfaces; insulation being configured to protect occupants from adverse temperature conditions from an Arctic or Antarctic environment about the building; the insulation being disposed with the at least one covering element to provide protection for occupants from adverse temperature conditions about the building; and a heating apparatus to provide heat to the space provided by the at least one covering element, the window, and the insulation in an adverse Arctic or Antarctic environment.

The invention also teaches a structure for containing human occupants in an adverse environment, the structure comprising: at least one covering element to provide a space to contain and protect occupants from an environment about the structure; a window comprising at least one pane; the at least one pane comprising at least one outer pane disposed to contact the adverse environment about the structure and at least one inner pane disposed toward the interior space of the structure; an opening to permit occupants to ingress into and egress from the structure; an apparatus to close the opening from the outside environment; the at least one pane comprising an outer pane exposed to the environment about the structure; the outer pane, exposed to the environment about the structure, comprising glass material; the glass material having a coefficient of thermal expansion that is minimized; the outer pane comprising a floated glass ceramic pane; insulation being configured to protect occupants from temperature conditions from an adverse Arctic or Antarctic environment about the structure; the insulation being disposed with the covering element to provide protection for occupants from temperature conditions from an adverse Arctic or Antarctic environment about the structure; and a heating apparatus to provide heat to the space provided by the at least one covering element, the window, and the insulation in an adverse Arctic or Antarctic environment.

The invention teaches a glazing for closed structures that are exposed to an extremely high temperature gradient.

Such extremely high temperature gradients are present, for example, on space stations, missiles for space flight or polar stations.

To guarantee high temperature strength, the glazing comprises a package of panels, the outermost panel of which, facing the environment, is made of glass ceramic.

The glass ceramic is preferably a floated glass ceramic on the basis of an aluminosilicate float glass which has a very low surface roughness, which makes possible a distortion-free view and is very easy to clean.

The glass ceramic panel is thereby transparent, so that it can be used as a window for the enclosed space in question.

It has been shown that glass ceramic can withstand the temperature gradients and temperature changes that occur. Glass ceramic is normally used for windows in the doors of furnaces and ovens in which the temperature can be up to 800° C. The prior art also describes the use of glass ceramics as fireproof safety glass. Given the conditions in space and in the polar regions, however, the decisive factor is not the maximum temperatures but the temperature fluctuations and temperature gradients to which the material is exposed, which temperature fluctuations and temperature gradients the glass ceramic surprisingly survives.

Glass ceramic has a hard surface that is highly resistant to any abrasive objects that may be flying around. Any damage to the glass ceramic is only in the form of small pits, chips or depressions. Nevertheless, if the window does break, the pane shatters into large fragments that may or may not be held in place by the frame. In such a case, a thermally stressed panel would represent a safety risk caused by fragments flying around.

The glazing claimed by the invention typically consists not only of a single pane, but also of a package of panels. This configuration makes it easy to replace the outer glass ceramic panel without having to replace the entire package of panels. A package of panels can be constructed analogous to an insulated window or laminated glass window that is designed for thermal or acoustical insulation.

Depending on the specific application, the outer glass ceramic panel can be flat, deformed or curved.

If the glass ceramic material contains $TiO_2$ as a nucleation agent, the glass ceramic panel also acts as a UV blocker, which is a significant advantage for the inhabitants of the enclosed space with regard to the prevention of damage caused by solar radiation.

The glass ceramic panel is preferably provided with coatings that are designed for different purposes, so that they can, for example, reduce surface reflection, reflect heat, be heated, or form a UV filter if the actual UV block is insufficient.

A conventional glass ceramic panel generally has a relatively rough surface, with a $R_a$ of 0.35 µm to 0.55 µm.

Therefore, there is a relatively significant diffraction effect which interferes with a distortion-free view through the window. This rough surface also makes it difficult to clean the glass ceramic panel.

In one embodiment of the invention, an undistorted view and ease of cleaning are made possible if the glass ceramic panel has a surface that is essentially free of pores.

This absence of pores on a glass ceramic panel can either be achieved, at added effort and expense, by polishing the surface, or by using a floated glass ceramic which is realized, in one embodiment of the invention, preferably in the form of a floated glass ceramic glazing, characterized by the fact that the package of panels, including the outer glass ceramic panel, is transparent.

This floated glass ceramic has a particularly low roughness with an average roughness $R_a \leq 0.02$ µm or a square average roughness $R_q \leq 0.01$ µm, and therefore has a low undesirable diffraction and is very easy to clean.

The definitions of surface roughness are explained in greater detail in DIN 4762, among other sources. For example, the average roughness $R_a$ is the arithmetic mean or average of the absolute height differences from the center plane, or the arithmetic average of the absolute amounts of the differences between the actual or measured profile and the average profile. This average profile is calculated by laying a profile through the measured profile within a reference length, so that the sum of the surface area of the measured profile filled with material on the top and the sum of the surface areas free of materials on the bottom are equal. On the basis of DIN 4762, $R_q$=square average roughness, determined by means of white light interference microscopy (measurement area 0.6×0.5 mm). In terms of formulas, this concept is expressed as follows:

$$R_a = \frac{(|Z_1| + |Z_2| + |Z_3| + \ldots + |Z_n|)}{N}$$

$$R_q = \sqrt{\frac{(Z_1^2 + Z_2^2 + Z_3^2 + \ldots + Z_n^2)}{N}}$$

The manufacture of flat glass ceramic objects is described by the prior art.

Theoretically, all glass ceramics floated according to the methods of the prior art can be used for the manufacture of the easy-to-clean glass ceramic object claimed by the invention.

To achieve a particularly good surface quality and thus a correspondingly high ease of cleaning, the initial glass used for the glass ceramic is a float glass, in which the origin of undesirable surface defects during the floating is prevented by restricting the concentrations of Pt to <300 ppb, Rh to <3.0 ppb, ZnO to <1.5 wt. % and $SnO_2$ to <1 wt. %, and by fining or refining the glass during the melting without using the conventional fining agents arsenic oxide or antimony oxide.

These types of glass are therefore characterized by a composition that makes it possible to prevent the formation of undesirable surface defects during floating. Floats conventionally consist of the melting chamber or hot end, in which the glass is melted and fined or refined, an interface that provides the transition from the oxide atmosphere in the melting chamber into the reducing atmosphere in the rest of the system, and the float portion, in which the glass is shaped by pouring it onto a molten metal, generally Sn, in a reducing atmosphere of forming gas. The glass is formed by allowing it to flow out smoothly onto the Sn bath and by top rollers that exert a force on the surface of the glass. During the transport on the metal bath, the glass cools, and at the end of the float portion, it is lifted off and transferred into a cooling furnace, lehr or annealing furnace/oven.

During the formation of the glass surface and the transport through the float, interactions between the glass and the float atmosphere or the Sn batch can result in undesirable surface defects.

If the glass contains more than 300 ppb Pt or more than 30 ppb Rh in dissolved form, metallic precipitations of Pt or Rh particles can form as a result of the reducing conditions in the glass surface, and these particles can serve as effective seeds for large high quartz or beta quartz mixed crystals up to 100 mm, and thus cause undesirable surface crystallization. These materials are used in, among other things, electrodes, linings, agitators, transport tubes, valve gates etc. In plants for the performance of the method for the manufacture of the glass ceramic described above, to prevent the formation of surface crystals, therefore, components that contain Pt or Rh are completely avoided, and are replaced by ceramic materials, or the conditions in the melting chamber or in the interface are realized so that the above-mentioned concentrations are not exceeded.

The ZnO concentration is restricted to 1.5 wt. %. It has been shown that under the reducing conditions of the floating, the zinc is depleted in the surface of the glass. It is thereby assumed that the zinc is partly reduced on the surface of the glass, whereupon it vaporizes as a result of the higher vapor pressure of Zn compared to $Zn^{2+}$ in the float atmosphere. In addition to the evaporation and deposition of the Zn in colder spots, which are undesirable for the operation of the float, the uneven distribution of the Zn in the glass also participates in the origin of critical crystal bands close to the surface. These crystal bands of large high or beta quartz mixed crystals originate in the vicinity of the surface where the Zn concentration in the glass has risen back close to the initial value. It is therefore appropriate to keep the initial value low from the start.

The concentration of $SnO_2$ in the glass is restricted to less than 1 wt. %. As a result of the action of the reducing conditions in the float portion, the $SnO_2$ is partly reduced, especially in the surface of the glass. Surprisingly, small metal Sn spheres form in the glass in the immediate surface of the glass, and, although they can easily be removed during cooling or cleaning, they leave behind spherical holes or pits or depressions that are extremely undesirable for the intended use of the glass.

These small spheres can be prevented if the concentration of $SnO_2$ is very low.

The above-mentioned initial glasses are fined or refined without using the fining agents arsenic oxide and/or antimony oxide which are conventional for glass from the $Li_2O$—$Al_2O_3$—$SiO_2$ system. Under the action of the reducing conditions during floating, the above mentioned fining agents in particular are reduced directly on the surface of the glass and form undesirable and visible metallic coatings. The removal of these coatings, which are aesthetically and toxicologically undesirable, requires grinding and polishing and is disadvantageous for economic reasons. To prevent the formation of the coatings, it is therefore appropriate to achieve a low seed number or number of seeds or number of bubbles by adding at least one alternative chemical fining agent, such as $SnO_2$, $CeO_2$, sulfate compounds, or chloride compounds, for example, preferably 0.2–0.6 wt. % $SnO_2$, to the molten glass. Alternatively, the molten glass can also be fined physically, e.g. by means of underpressure or by means of high temperature >1750° C. Thus the required seed quality or number of bubbles can be achieved by means of alternative fining agents and/or alternative fining methods.

During the ceramization, care must be taken to avoid any adverse effect on the low roughness values achieved by floating, for example, by conducting the ceramization vertically or by an air-cushion ceramization, i.e. generally without any contact between the glass object being ceramized and a substrate.

Special advantages with regard to a very low surface roughness of the glass ceramic are achieved by a floated, ceramized aluminosilicate glass with the following composition in wt. % on an oxide basis: $Li_2O$ comprising three and two tenths to five weight percent and within the range percentages in tenth of percent steps such that any tenth of a percent may be a limit of a diminished range; $Na_2O$ comprising zero to one and five tenths weight percent and within the range percentages in tenth of percent steps such that any tenth of a percent may be a limit of a diminished range; $K_2O$ comprising zero to one and five tenths weight percent and within the range percentages in tenth of percent steps such that any tenth of a percent may be a limit of a diminished range; $\Sigma Na_2O+K_2O$ comprising two tenths to two weight percent and within the range percentages in tenth of percent steps such that any tenth of a percent may be a limit of a diminished range; MgO comprising one tenth to two and two tenths weight percent and within the range percentages in tenth of percent steps such that any tenth of a percent may be a limit of a diminished range; CaO comprising zero to one and five tenths weight percent and within the range percentages in tenth of percent steps such that any tenth of a percent may be a limit of a diminished range; SrO comprising zero to one and five tenths weight percent and within the range percentages in tenth of percent steps such that any tenth of a percent may be a limit of a diminished range; BaO comprising zero to two and five tenths weight percent and within the range percentages in tenth of percent steps such that any tenth of a percent may be a limit of a diminished range; ZnO comprising zero to less than one and five tenths weight percent and within the range percentages in tenth of percent steps such that any tenth of a percent may be a limit of a diminished range; $Al_2O_3$ comprising nineteen to twenty-five weight percent and within the range percentages in tenth of percent steps such that any tenth of a percent may be a limit of a diminished range; $SiO_2$ comprising fifty-five to sixty-nine weight percent and within the range percentages in tenth of percent steps such that any tenth of a percent may be a limit of a diminished range; $TiO_2$ comprising one to five weight percent and within the range percentages in tenth of percent steps such that any tenth of a percent may be a limit of a diminished range; $ZrO_2$ comprising one to two and five tenths weight percent and within the range percentages in tenth of percent steps such that any tenth of a percent may be a limit of a diminished range; $SnO_2$ comprising zero to less than one weight percent and within the range percentages in tenth of percent steps such that any tenth of a percent may be a limit of a diminished range; $\Sigma TiO_2+ZrO_2+SnO_2$ comprising two and five tenths to five weight percent and within the range percentages in tenth of percent steps such that any tenth of a percent may be a limit of a diminished range; $P_2O_5$ comprising zero to three weight percent and within the range percentages in tenth of percent steps such that any tenth of a percent may be a limit of a diminished range.

In a second realization, the glass in one particularly preferred embodiment has a composition, in wt. % on an oxide basis, of: $Li_2O$ comprising three and five tenths to four and five tenths weight percent and within the range percentages in tenth of percent steps such that any tenth of a percent may be a limit of a diminished range; $Na_2O$ comprising two tenths to one weight percent and within the range percentages in tenth of percent steps such that any tenth of a percent may be a limit of a diminished range; $K_2O$ comprising zero to eight tenths weight percent and within the range percentages in tenth of percent steps such that any tenth of a percent may be a limit of a diminished range; $\Sigma Na_2O+K_2O$ comprising four tenths to one and five tenths weight percent and within the range percentages in tenth of percent steps such that any tenth of a percent may be a limit of a diminished range; MgO comprising three tenths to two weight percent and within the range percentages in tenth of percent steps such that any tenth of a percent may be a limit of a diminished range; CaO comprising zero to one weight percent and within the range percentages in tenth of percent steps such that any tenth of a percent may be a limit of a diminished range; SrO comprising zero to one weight percent and within the range percentages in tenth of percent steps such that any tenth of a percent may be a limit of a diminished range; BaO comprising zero to two and five tenths weight percent and within the range percentages in tenth of percent steps such that any tenth of a percent may be a limit of a diminished range; ZnO comprising zero to one and weight percent within the range percentages in tenth of percent steps such that any tenth of a percent may be a limit of a diminished range; $Al_2O_3$ comprising nineteen to twenty-four weight percent and within the range percentages in tenth of percent steps such that any tenth of a percent may be a limit of a diminished range; $SiO_2$ comprising sixty to sixty-eight weight percent and within the range percentages in tenth of percent steps such that any tenth of a percent may be a limit of a diminished range; $TiO_2$ comprising one to two weight percent and within the range percentages in tenth of percent steps such that any tenth of a percent may be a limit of a diminished range; $ZrO_2$ comprising one and two tenths to two and two tenths weight percent and within the range percentages in tenth of percent steps such that any tenth of a percent may be a limit of a diminished range; $SnO_2$ comprising zero to six tenths weight percent and within the range percentages in tenth of percent steps such that any tenth of a percent may be a limit of a diminished range; $\Sigma TiO_2+ZrO_2+SnO_2$ comprising three to four and five tenths weight percent and within the range percentages in tenth of percent steps such that any tenth of a percent may be a limit of a diminished range; $P_2O_5$ comprising zero to two weight percent and within the range percentages in tenth of percent steps such that any tenth of a percent may be a limit of a diminished range.

This glass is used with particular advantage for the manufacture of the glass ceramic object claimed by the invention, because the corresponding surface is very easy to clean.

The above-discussed embodiments of the present invention will be described further herein below. When the word "invention" is used in this specification, the word "invention" includes "inventions", that is, the plural of "invention". By stating "invention", the Applicants do not in any way admit that the present application does not include more than one patentably and non-obviously distinct invention, and maintain that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the accompanying drawings, wherein.

DESCRIPTION OF THE PREFERRED EMBODIMENT

Figure 1:
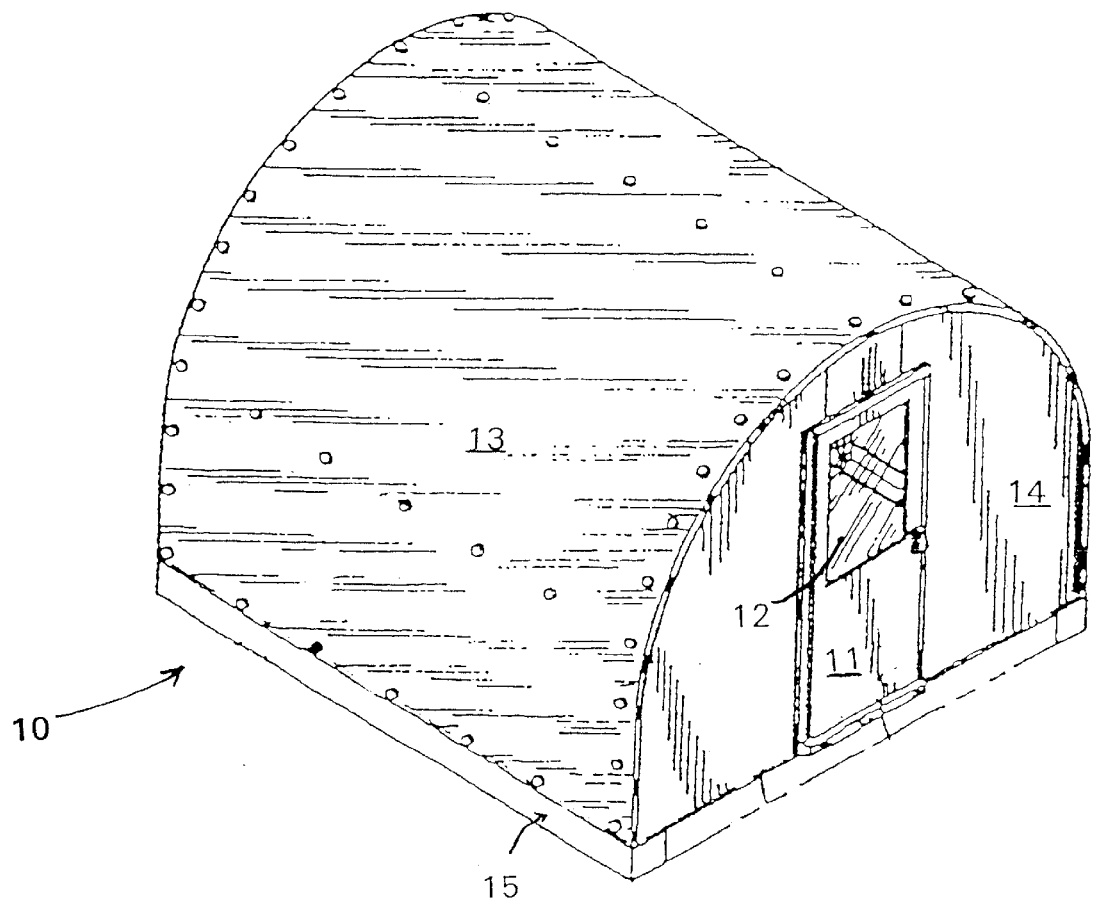
FIG. 1: is a perspective view of a quonset type housing unit.

FIG. 1 shows a quonset type housing unit 10 with a roof 13, a floor 15, and a wall 14. The building 10 has a door or opening 11 with a window 12 with glazing.

Figure 2:
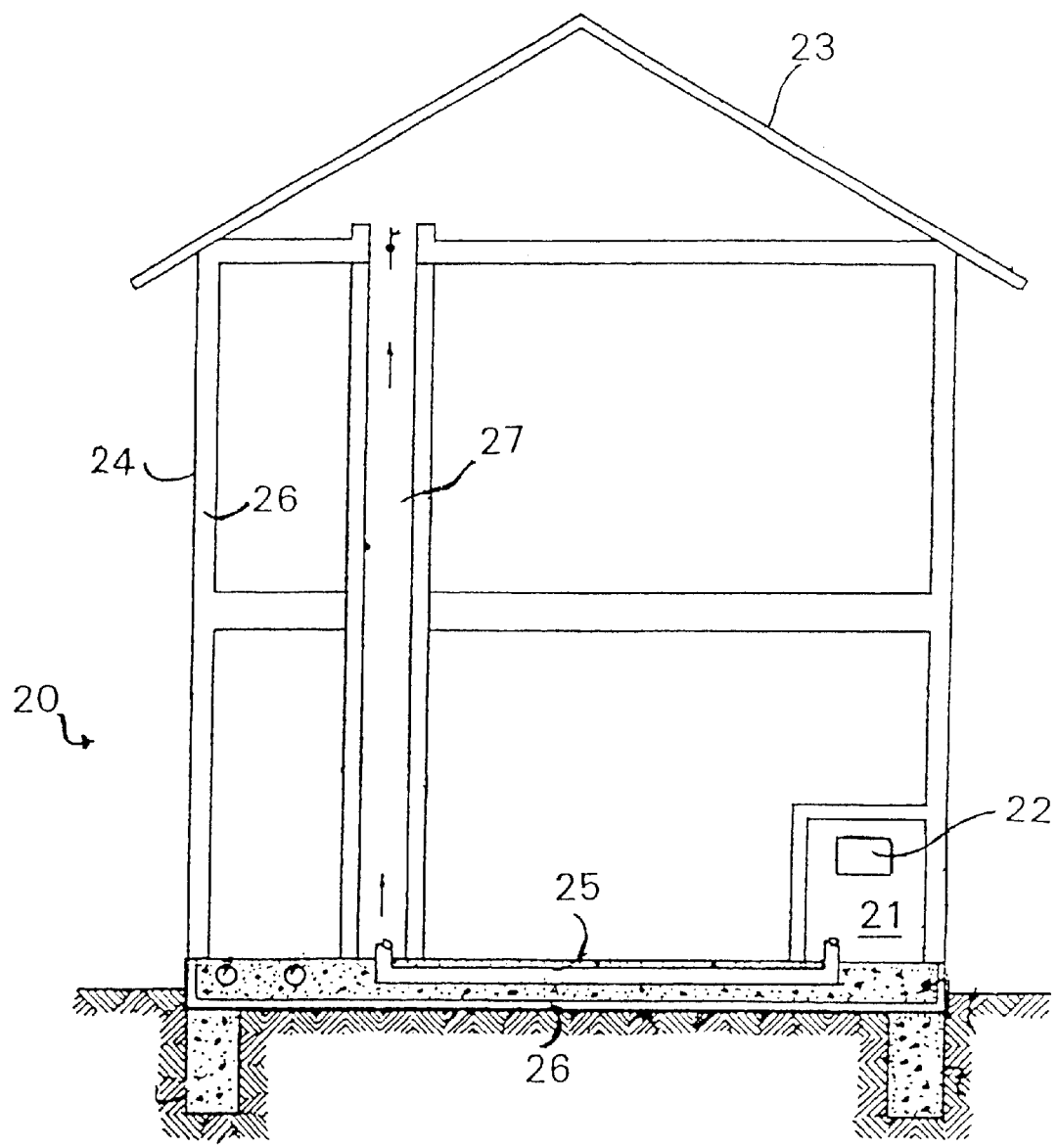
FIG. 2: is a vertical section through a building.

FIG. 2 illustrates an example of a building 20 with a roof 23, walls 24, and a floor 25. An insulating material 26 is disposed in the walls 24 and the floor 25. The building 20 also has a door 21 with a window 22 with glazing and a heating apparatus 27.

Figure 3A:
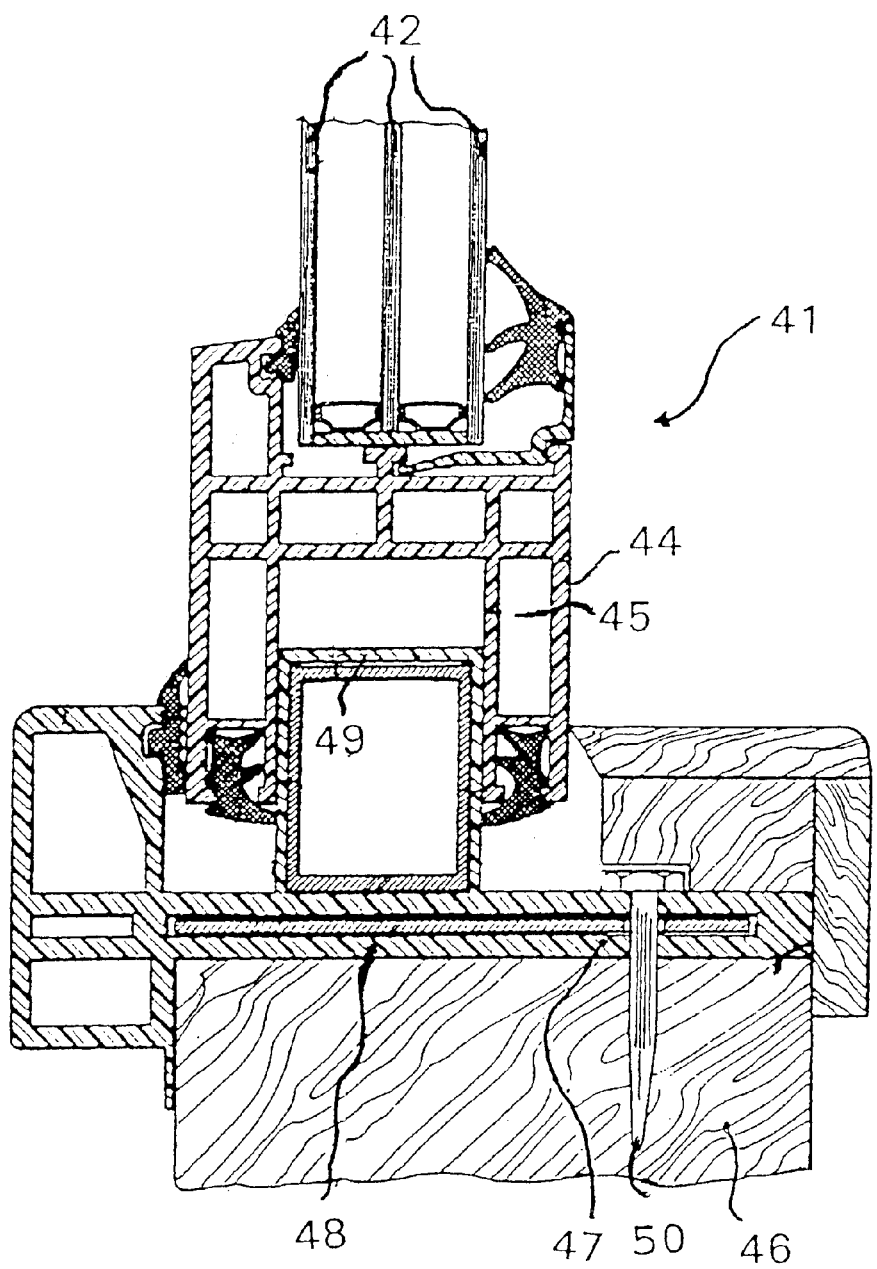
FIG. 3A: is a detail section through a fixed arctic window or door.
Figure 3B:
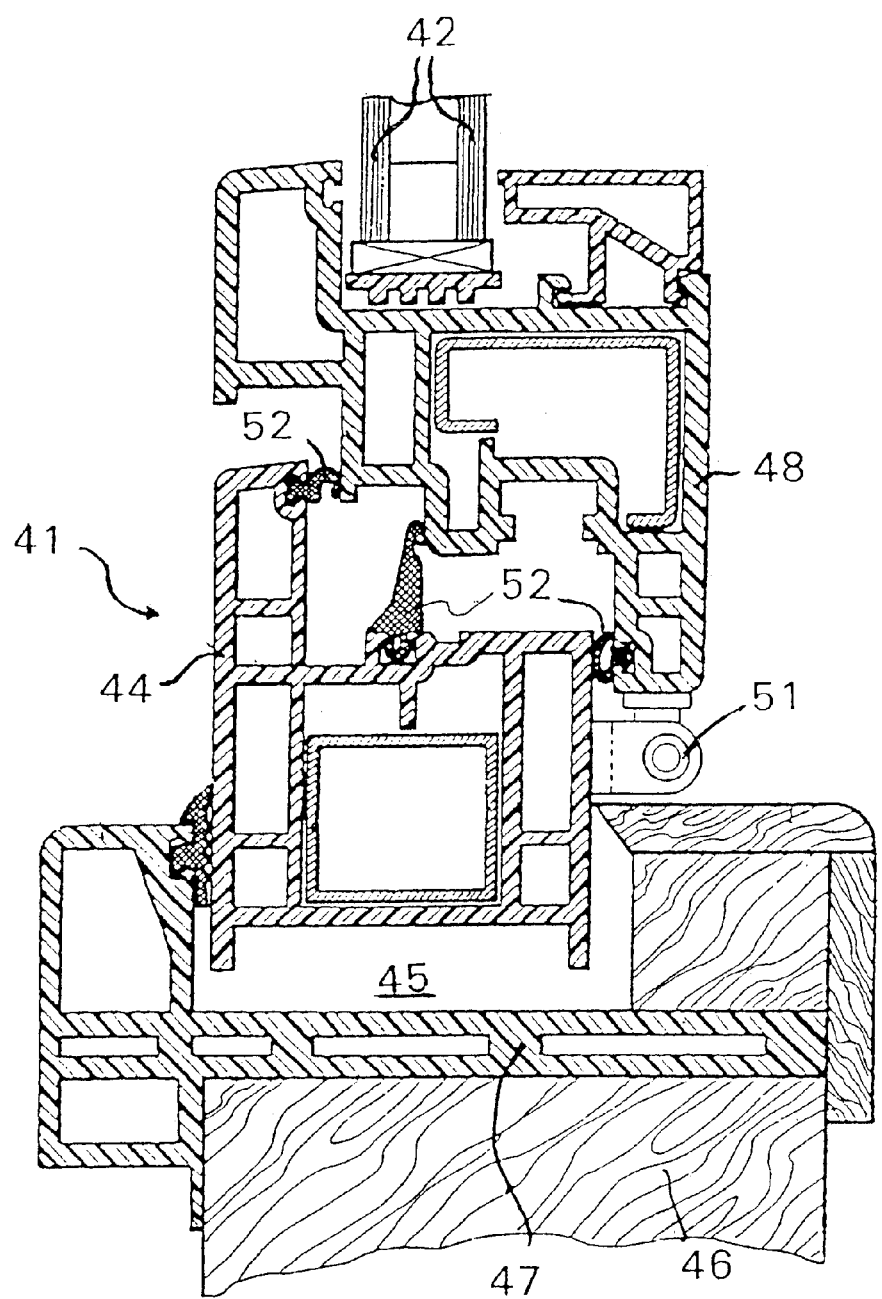
FIG. 3B: is a detail section through a movable arctic window or door.

FIGS. 3A and 3B show two embodiments of an arctic window or door for use in structures in polar regions. FIG. 3A shows a fixed arctic window with a frame 41, a glass pane 42, and a frame bar 44. The frame bar 44 creates a channel 45. The frame 41 is also provided with a retaining rail 49. The window frame 41 is attached to a wall portion 46 of a structure via a window wing 48 with a case 47 that is that is screwed to the wall portion 46 of a structure with a screw or bolt 50.

FIG. 3B shows a movable arctic window or door with a frame 41, a glass pane 42, and a frame bar 44. The frame 41 is attached to a wall portion 46 of a structure via a window wing 48 with a case 47. The window also has a hinge 51 and elastic seals 52 which permit movement.

Figure 4:
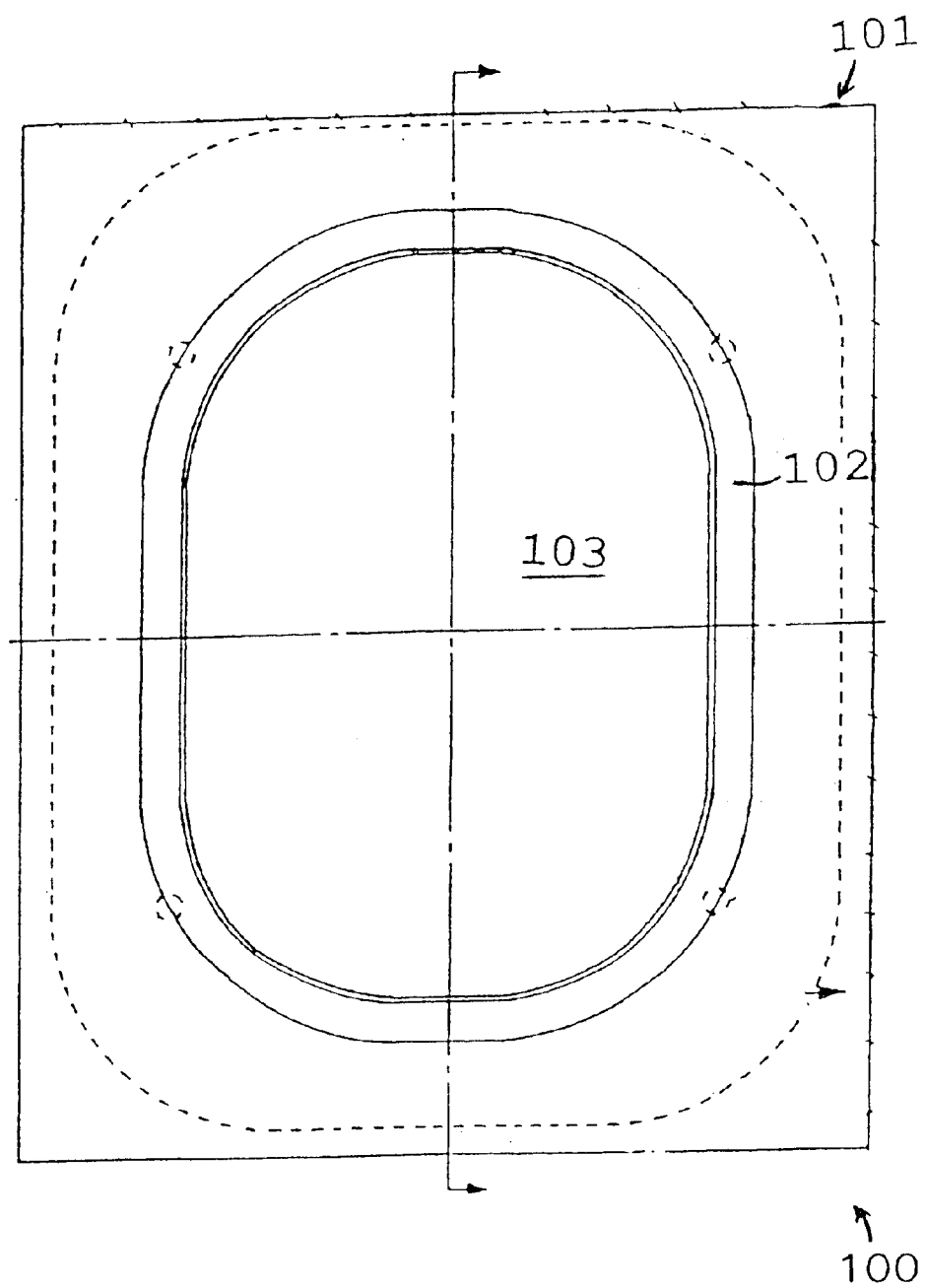
FIG. 4: is a plan view of a window for aircraft.
Figure 5:
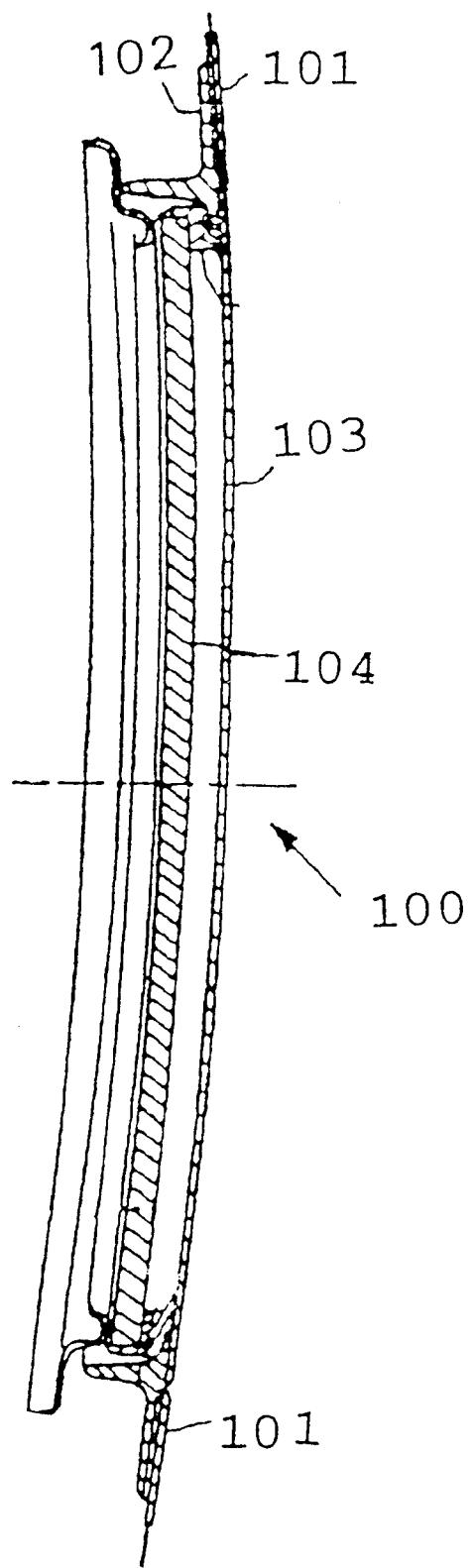
FIG. 5: is a cross-sectional view of a window for aircraft.

FIG. 4 illustrates a window 100 for an aircraft such as an airplane. The window 100 has an outer skin 101 and an inner frame 102 which holds an outer pane 103. FIG. 5, a cross-section of a window for an airplane, shows that the window 100 also has an inner pane 104.

One feature of the invention resides broadly in a building for containing human occupants in an adverse Arctic or Antarctic environment, said building comprising: at least one covering element to provide at least one roof portion, at least one wall portion, and at least one floor portion, to provide an interior space to contain and protect occupants from an adverse environment about the building; the at least one covering element being configured to provide protection to occupants in an adverse Arctic or Antarctic environment; an opening to permit occupants to ingress into and egress from the building; an apparatus to close the opening from the outside environment; a window comprising a frame and at least one pane disposed in the frame; the window being configured to protect occupants from an adverse Arctic or Antarctic environment; the at least one pane comprising at least one outer pane disposed to contact the adverse environment about the building and at least one inner pane disposed toward the interior space of the building; the at least one outer pane comprising an outer surface disposed to contact the adverse environment and an inner surface facing toward the at least one inner pane; the pane exposed to the environment about the building comprising a transparent glass material; the glass material having a coefficient of thermal expansion that is minimized such that the glass material of the at least one outer pane is configured to withstand extreme temperature gradients from the outer surface to the inner surface of the at least one outer pane; at least the outer surface of the at least one outer pane being configured to have a surface roughness which is minimized, thus providing a view through the at least one pane having a distortion which is minimized and providing an easy-to-clean outer surface; the glass material being substantially free of pits and pores on at least the outer and the inner surfaces; insulation being configured to protect occupants from adverse temperature conditions from an Arctic or Antarctic environment about the building; the insulation being disposed with the at least one covering element to provide protection for occupants from adverse temperature conditions about the building; and a heating apparatus to provide heat to the space provided by the at least one covering element, the window, and the insulation in an adverse Arctic or Antarctic environment.

Another feature of the invention resides broadly in a structure for containing human occupants in an adverse environment, the structure comprising: at least one covering element to provide a space to contain and protect occupants from an environment about the structure; a window comprising at least one pane; the at least one pane comprising at least one outer pane disposed to contact the adverse environment about the structure and at least one inner pane disposed toward the interior space of the structure; an opening to permit occupants to ingress into and egress from the structure; an apparatus to close the opening from the outside environment; the at least one pane comprising an outer pane exposed to the environment about the structure; the outer pane, exposed to the environment about the structure, comprising glass material; the glass material having a coefficient of thermal expansion that is minimized; the outer pane comprising a floated glass ceramic pane; insulation being configured to protect occupants from temperature conditions from an adverse Arctic or Antarctic environment about the structure; the insulation being disposed with the covering element to provide protection for occupants from temperature conditions from an adverse Arctic or Antarctic environment about the structure; and a heating apparatus to provide heat to the space provided by the at least one covering element, the window, and the insulation in an adverse Arctic or Antarctic environment.

Yet another feature of the invention resides broadly in a glazing for closed structures for use in an environment in space or in polar regions that are exposed, during operation, to an extremely high temperature gradient, consisting of a package of panels, in which the outer panel facing the environment is made of glass ceramic.

Still another feature of the invention resides broadly in a glazing characterized by the fact that the package of panels, including the outer glass ceramic panel, is transparent.

A further feature of the invention resides broadly in a glazing characterized by the fact that the outer glass ceramic panel has at least one coating.

Another feature of the invention resides broadly in a glazing characterized by the fact that the coatings are made of a material that reduces surface reflection, reflects heat and/or can be heated and/or absorbs UV radiation.

Yet another feature of the invention resides broadly in a glazing characterized by the fact that the glass ceramic panel has a surface that is free of pores or pits.

Still another feature of the invention resides broadly in a glazing characterized by the fact that the glass ceramic panel has a polished surface.

A further feature of the invention resides broadly in a glazing characterized by a floated glass ceramic ceramized from a thermally prestressable aluminosilicate float glass, which glass ceramic has a surface structure with a roughness measured by the average roughness $R_a \leq 0.02$ μm and/or the square average roughness $R_q \leq 0.01$ μm.

Another feature of the invention resides broadly in a glazing manufactured from an initial glass that can be floated, thermally prestressed and transformed into a glass ceramic with high quartz mixed crystals or keatite mixed crystals that has a content of less than 300 ppb Pt, less than 30 ppb Rh, less than 1.5 wt. ZnO and less than 1 wt. % $SnO_2$, that is fined during melting without the use of the conventional fining agents arsenic oxide and/or antimony oxide, and that has been formed by being poured onto a molten metal in a reducing atmosphere.

Yet another feature of the invention resides broadly in a glazing with a floated aluminosilicate glass as the initial glass.

Still another feature of the invention resides broadly in a glazing characterized by a composition of the initial glass (in wt. % on an oxide basis) of: $Li_2O$ comprising three and two tenths to five weight percent and within the range percentages in tenth of percent steps such that any tenth of a percent may be a limit of a diminished range; $Na_2O$ comprising zero to one and five tenths weight percent and within the range percentages in tenth of percent steps such that any tenth of a percent may be a limit of a diminished range; $K_2O$ comprising zero to one and five tenths weight percent and within the range percentages in tenth of percent steps such that any tenth of a percent may be a limit of a diminished range; $\Sigma Na_2O+K_2O$ comprising two tenths to two weight percent and within the range percentages in tenth of percent steps such that any tenth of a percent may be a limit of a diminished range; MgO comprising one tenth to two and two tenths weight percent and within the range percentages in tenth of percent steps such that any tenth of a percent may be a limit of a diminished range; CaO comprising zero to one and five tenths weight percent and within the range percentages in tenth of percent steps such that any tenth of a percent may be a limit of a diminished range; SrO comprising zero to one and five tenths weight percent and within the range percentages in tenth of percent steps such that any tenth of a percent may be a limit of a diminished range; BaO comprising zero to two and five tenths weight percent and within the range percentages in tenth of percent steps such that any tenth of a percent may be a limit of a diminished range; ZnO comprising zero to less than one and five tenths weight percent and within the range percentages in tenth of percent steps such that any tenth of a percent may be a limit of a diminished range; $Al_2O_3$ comprising nineteen to twenty-five weight percent and within the range percentages in tenth of percent steps such that any tenth of a percent may be a limit of a diminished range; $SiO_2$ comprising fifty-five to sixty-nine weight percent and within the range percentages in tenth of percent steps such that any tenth of a percent may be a limit of a diminished range; $TiO_2$ comprising one to five weight percent and within the range percentages in tenth of percent steps such that any tenth of a percent may be a limit of a diminished range; $ZrO_2$ comprising one to two and five tenths weight percent and within the range percentages in tenth of percent steps such that any tenth of a percent may be a limit of a diminished range; $SnO_2$ comprising zero to less than one weight percent and within the range percentages in tenth of percent steps such that any tenth of a percent may be a limit of a diminished range; $\Sigma TiO_2+ZrO_2+SnO_2$ comprising two and five tenths to five weight percent and within the range percentages in tenth of percent steps such that any tenth of a percent may be a limit of a diminished range; $P_2O_5$ comprising zero to three weight percent and within the range percentages in tenth of percent steps such that any tenth of a percent may be a limit of a diminished range with the optional addition of coloring components such as V, Cr, Mn, Fe, Co, Cu, Ni, Se and/or Cl compounds.

A further feature of the invention resides broadly in a glazing characterized by a composition, in wt. % on an oxide basis, of: $Li_2O$ comprising three and five tenths to four and five tenths weight percent and within the range percentages in tenth of percent steps such that any tenth of a percent may be a limit of a diminished range; $Na_2O$ comprising two tenths to one weight percent and within the range percentages in tenth of percent steps such that any tenth of a percent may be a limit of a diminished range; $K_2O$ comprising zero to eight tenths weight percent and within the range percentages in tenth of percent steps such that any tenth of a percent may be a limit of a diminished range; $\Sigma Na_2O+K_2O$ comprising four tenths to one and five tenths weight percent and within the range percentages in tenth of percent steps such that any tenth of a percent may be a limit of a diminished range; MgO comprising three tenths to two weight percent and within the range percentages in tenth of percent steps such that any tenth of a percent may be a limit of a diminished range; CaO comprising zero to one weight percent and within the range percentages in tenth of percent steps such that any tenth of a percent may be a limit of a diminished range; SrO comprising zero to one weight percent and within the range percentages in tenth of percent steps such that any tenth of a percent may be a limit of a diminished range; BaO comprising zero to two and five tenths weight percent and within the range percentages in tenth of percent steps such that any tenth of a percent may be a limit of a diminished range; ZnO comprising zero to one and weight percent within the range percentages in tenth of percent steps such that any tenth of a percent may be a limit of a diminished range; $Al_2O_3$ comprising nineteen to twenty-four weight percent and within the range percentages in tenth of percent steps such that any tenth of a percent may be a limit of a diminished range; $SiO_2$ comprising sixty to sixty-eight weight percent and within the range percentages in tenth of percent steps such that any tenth of a percent may be a limit of a diminished range; $TiO_2$ comprising one to two weight percent and within the range percentages in tenth of percent steps such that any tenth of a percent may be a limit of a diminished range; $ZrO_2$ comprising one and two tenths to two and two tenths weight percent and within the range percentages in tenth of percent steps such that any tenth of a percent may be a limit of a diminished range; $SnO_2$ comprising zero to six tenths weight percent and within the range percentages in tenth of percent steps such that any tenth of a percent may be a limit of a diminished range; $\Sigma TiO_2+ZrO_2+SnO_2$ comprising three to four and five tenths weight percent and within the range percentages in tenth of percent steps such that any tenth of a percent may be a limit of a diminished range; $P_2O_5$ comprising zero to two weight percent and within the range percentages in tenth of percent steps such that any tenth of a percent may be a limit of a diminished range with the optional addition of coloring components such as V, Cr, Mn, Fe, Co, Cu, Ni, Se and/or Cl compounds.

Another feature of the invention resides broadly in a glazing characterized by the fact that for the initial glass, to avoid the formation of a damaging crystal band near the surface during floating, the expression (in wt. %): $3.2 \times ZnO + TiO_2 \leq 4.3$ is value.

Yet another feature of the invention resides broadly in a glazing characterized by contents of less than 200 ppb $Fe_2O_3$ and less than 2.5 wt. % $TiO_2$ in the initial glass, to counteract an undesired coloration or discoloration in the vitrified state and to achieve a light transmittance of >89% and preferably >90% at a thickness of 4 mm.

Still another feature of the invention resides broadly in a glazing, characterized by a coefficient of thermal expansion $\alpha_{20/300}$ between 3.5 and $5.0 \times 10^{-6}$/K, a transformation temperature $T_g$ between 600 and 750° C. and a processing temperature $V_A$ of the glass ceramic below 1350° C.

A further feature of the invention resides broadly in a glazing characterized by a coefficient of thermal expansion of the glass ceramic with keatite mixed crystals as the predominant crystal phase of less than $1.5 \times 10^{-6}$/K.

Another feature of the invention resides broadly in a glazing characterized by a coefficient of thermal expansion of the glass ceramic with high quartz mixed crystals as the predominant phase of $(0 \pm 0.3) \times 10^{-6}$/K, preferably $(0 \pm 0.15) \times 10^{-6}$/K and a light transmittance of >80%.

The components disclosed in the various publications, disclosed or incorporated by reference herein, may be used in the embodiments of the present invention, as well as equivalents thereof.

The appended drawings in their entirety, including all dimensions, proportions and/or shapes in at least one embodiment of the invention, are accurate and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication application, namely, Federal Republic of Germany Patent Application No. DE 100 17 699.2-45, filed on Apr. 8, 2000, having inventors Dr. Sabine MELSON and Stefan HUBERT, entitled "verglasung von gegenüber der Umgebung im Weltraum oder in Polarregionen abgekapselten Räumen," and DE-OS 100 17 699.2-45 and DE-PS 100 17 699.2-45, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

Another foreign patent publication application, namely, Federal Republic of Germany Patent Application No. DE 100 17 698.4-45, filed on Apr. 8, 2000, having inventors Dr. Sabine MELSON, Dr. K. SCHAUPERT, and Dr. Peter NAβ, entitled "Reinigungsfreundlicher Glaskeramikkörper," and DE-OS 100 17 698.4-45 and DE-PS 100 17 698.4-45, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

Yet another foreign patent publication application, namely, Federal Republic of Germany Patent Application No. DE 100 17 701.8-45, filed on Apr. 8, 2000, having inventors Dr. Friedrich SIEBERS, Dr. Peter NAβ, Dr. Gerhard LAUTENSCHLÄGER, and Dr. Otmar BECKER, entitled, "Gefloatetes Flachglas," and DE-OS 100 17 701.8-45 and DE-PS 100 17 701.8-45, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

A further foreign patent publication application, namely, Federal Republic of Germany Patent Application No. DE 100 17 696.8-33, filed on Apr. 8, 2000, having inventors Dr. Sabine MELSON and Dr. Peter NAβ, entitled, "Transparente Abdeckung der Strahlungsquelle von Lampen," and DE-OS 100 17 696.8-33 and DE-PS 100 17 696.8-33, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The following U.S. patent application is to be incorporated by reference as follows: U.S. patent application Ser. No. 09/828,288, entitled "A Cooking Arrangement for Cooking Food Such as a Stove, a Cooktop, and Other Cooking Appliances, with an Easy-to-Clean Surface," having attorney docket No. NHL-FMW-01 US (SCT), having inventors Sabine MELSON, K. SCHAUPERT, and Peter NAβ, filed on Apr. 6, 2001 is hereby incorporated by reference as if set forth in its entirety herein.

The following U.S. patent application is to be incorporated by reference as follows: U.S. patent application Ser. No. 09/829,409, entitled "Flat Float Glass," having attorney docket No. NHL-FMW-02 US (SCT), having inventors Friedrich SIEBERS, Peter NAβ, Gerhard LAUTENSCHLÄGER, and Otmar BECKER, filed on Apr. 6, 2001 is hereby incorporated by reference as if set forth in its entirety herein.

The following U.S. patent application is to be incorporated by reference as follows: U.S. patent application Ser. No. 09/828,286, entitled, "Lamp with an Unpolished Surface and Radiant Source Lamps with a Transparent Cover for the Radiant Source," having attorney docket No. NHL-FMW-04 US (SCT), having inventors Sabine MELSON and Peter NAβ, filed on Apr. 6, 2001 is hereby incorporated by reference as if set forth in its entirety herein.

German Patent No. 30 49 491 C2, German Patent No. 42 27 672 C2, French Patent No. 2 626 964, European Patent No. 0 069 298 B1 and German Patent Application No. 197 05 715.2.-16 are hereby incorporated as if set forth in their entirety herein.

The following U.S. Patents are hereby incorporated by reference as if set forth in their entirety herein as follows:

U.S. Pat. No. 6,021,774, having inventors Taplan et al., issued on Feb. 8, 2000; U.S. Pat. No. 6,148,812, having inventors Taplan et al., issued on Nov. 21, 2000; U.S. Pat. No. 6,002,112, having inventors NAβ et al., issued on Dec. 14, 1999; U.S. Pat. No. 6,111,229, having inventor Schultheis, issued on Aug. 29, 2000; and U.S. Pat. No. 6,050,176, having inventors Schultheis et al., issued on Apr. 18, 2000.

Some examples of windows for aircraft which may be utilized or adapted for use in at least one possible embodiment of the present invention may be found in the following U.S. patents: U.S. Pat. No. 4,828,204, having inventor Friebel, issued on May 9, 1989; U.S. Pat. No. 5,988,566, having inventor Meyer, issued on Nov. 23, 1999; U.S. Pat. No. 5,662,152, having inventors Sanz et al., issued on Sep. 2, 1997; U.S. Pat. No. 5,954,109, having inventor Sanz, issued on Sep. 21, 1999; U.S. Pat. No. 6,168,112 B1, having inventors Mueller et al., issued on Jan. 2, 2001; U.S. Pat. No. 4,036,012, having inventor Monsler, issued on Jul. 19, 1977; and U.S. Pat. No. 4,786,548, having inventor Place, Jr., issued on Nov. 22, 1988. The aforementioned patents are hereby incorporated by reference as if set forth in their entirety herein.

Some examples of doors for aircraft which may be utilized or adapted for use in at least one possible embodiment of the present invention may be found in the following U.S. patents: U.S. Pat. No. 6,189,833 B1, having inventors Ambrose et al., issued on Feb. 20, 2001; U.S. Pat. No. 6,168,114 B1, having inventor Erben, issued on Jan. 2, 2001; U.S. Pat. No. 6,116,542, having inventor Erben, issued on Sep. 12, 2000; U.S. Pat. No. 5,868,355, having inventor Carter, Jr., issued on Feb. 9, 1999; and U.S. Pat. No. 5,678,787, having inventors Kahn et al., issued on Oct. 21, 1997.

Some examples of buildings for use in Arctic climates and/or windows and doors for Arctic buildings that may be utilized or adapted for use in at least one possible embodiment of the present invention may be found in the following U.S. patents: U.S. Pat. No. 4,848,046, having inventor Wallhead, issued on Jul. 18, 1989; U.S. Pat. No. 4,023,317, having inventors Bettger et al., issued on May 17, 1977; U.S. Pat. No. 5,950,512, having inventor Fields, issued on Sep. 14, 1999; and U.S. Pat. No. 6,047,519, having inventor Bagn, issued on Apr. 11, 2000; U.S. Pat. No. 4,676,026, having inventor Schreiner, issued on Jun. 30, 1987; U.S. Pat. No. 5,044,830, having inventors Barbaras et al., issued on Sep. 3, 1991; U.S. Pat. No. 4,906,138, having inventors Barbaras et al., issued on Mar. 6, 1990; and U.S. Pat. No. 4,784,526, having inventor Turner, issued on Nov. 15, 1988. The aforementioned patents are hereby incorporated by reference as if set forth in their entirety herein.

Some examples of quonset type housing units or structures which may be utilized or adapted for use in at least one possible embodiment of the present invention may be found in the following U.S. patents: U.S. Pat. No. 5,333,421, having inventor McKenna, issued on Aug. 2, 1994; and U.S. Pat. No. 4,649,676, having inventor Davey, issued on Mar. 17, 1987. The aforementioned patents are hereby incorporated by reference as if set forth in their entirety herein.

An example of another building which may be utilized or adapted for use in at least one possible embodiment of the present invention may be found in the following U.S. patent: U.S. Pat. No. 5,988,566, having inventor Meyer, issued on Nov. 23, 1999. The aforementioned patent is hereby incorporated by reference as if set forth in its entirety herein.

Some examples of ceramic materials which may be utilized or adapted for use in at least one possible embodiment of the present invention may be found in the following U.S. patents: U.S. Pat. No. 5,385,873, issued on Jan. 31, 1995; U.S. Pat. No. 5,407,740, issued on Apr. 18, 1995; U.S. Pat. No. 5,420,399, issued on May 30, 1995; U.S. Pat. No. 5,422,319, issued on Jun. 6, 1995; U.S. Pat. No. 5,449,649, issued on Sep. 12, 1995; U.S. Pat. No. 5,476,684, issued on Dec. 19, 1995; and U.S. Pat. No. 5,691,261, issued on Nov. 25, 1997. The aforementioned patents are hereby incorporated by reference as if set forth in their entirety herein.

Some examples of adhesive materials which may possibly be utilized or adapted for use in at least one possible embodiment of the present invention may be found in the following U.S. patents: U.S. Pat. No. 5,225,662, issued on Jul. 6, 1993; U.S. Pat. No. 5,268,338, issued on Dec. 7, 1993; U.S. Pat. No. 5,288,674, issued on Feb. 22, 1994; U.S. Pat. No. 5,300,627, issued on Apr. 5, 1994; U.S. Pat. No. 5,403,228, issued on Apr. 4, 1995; U.S. Pat. No. 5,432,320, issued on Jul. 11, 1995; U.S. Pat. No. 5,468,290, issued on Nov. 21, 1995; and U.S. Pat. No. 5,475,044, issued on Dec. 12, 1995. The aforementioned patents are hereby incorporated by reference as if set forth in their entirety herein.

Some examples of insulation which may be utilized or adapted for use in at least one possible embodiment of the present invention may be found in the following U.S. patents: U.S. Pat. No. 5,983,586, having inventors Berdan, II et al., issued on Nov. 16, 1999; U.S. Pat. No. 5,953,875, having inventor Harkins, issued on Sep. 21. 1999; U.S. Pat. No. 5,901,518, having inventor Harkins, issued on May 11, 1999; U.S. Pat. No. 5,755,067, having inventor Mercurio, issued on May 26, 1998; and U.S. Pat. No. 5,425,210, having inventor Zafir, issued on Jun. 20, 1995. The aforementioned patents are hereby incorporated by reference as if set forth in their entirety herein.

Some examples of thermally insulating materials which may be utilized or adapted for use in at least one possible embodiment of the present invention may be found in the following U.S. patents: U.S. Pat. No. 5,408,832, issued on Apr. 25, 1995; U.S. Pat. No. 5,420,401, issued on May 30, 1995; U.S. Pat. No. 5,449,232, issued on Sep. 12, 1995; U.S. Pat. No. 5,456,682, issued on Oct. 10, 1995; and U.S. Pat. No. 5,469,683, issued on Nov. 28, 1995. The aforementioned patents are hereby incorporated by reference as if set forth in their entirety herein.

Some examples of float glass and/or glass ceramics that may be utilized or adapted for use in at least one possible embodiment of the present invention may be found in the following U.S. patents: U.S. Pat. No. 6,143,417, having inventors Nomura et al., issued on Nov. 7, 2000; U.S. Pat. No. 6,065,309, having inventors Cooper et al., issued on May 23, 2000; U.S. Pat. No. 5,723,172, having inventor Sherman, issued on Mar. 3, 1998; U.S. Pat. No. 5,846,279, having inventors Nomura et al., issued on Dec. 8, 1998; U.S. Pat. No. 5,665,424, having inventor Sherman, issued on Sep. 9, 1997; and U.S. Pat. No. 4,859,636, having inventors Aratani et al., issued on Aug. 22, 1989. The aforementioned patents are hereby incorporated by reference as if set forth in their entirety herein.

Some examples of flat glass production which may possibly be incorporated in an example of the present invention may be found in U.S. Pat. No. 3,218,143 issued to De Lajarte on Nov. 16, 1965 and entitled "Process for the manufacture of flat glass"; U.S. Pat. No. 3,930,826 issued to Schornhorst on Jan. 6, 1976 and entitled "Conditioning flat glass for removal from supporting liquid following forming"; U.S. Pat. No. 3,938,979 issued to Plumat on Feb. 147, 1976 and entitled "Method and apparatus for vertically drawing a glass ribbon"; U.S. Pat. No. 4,801,321 issued to Pita et al. on Jan. 31, 1989 and entitled "Method for the manufacturing of glass sheets"; U.S. Pat. No. 4,214,886 issued to Shay et al. on Jul. 29, 1980 and entitled "Forming laminated sheet glass"; U.S. Pat. No. 4,209,315 issued to Spurling on Jun. 24, 1980 and entitled "Glass forming apparatus"; U.S. Pat. No. 4,929,266 issued to Cozac et al. on May 29, 1990 and entitled "Method of manufacturing glass"; and U.S. Pat. No. 5,078,777 issued to Cozac et al. on Jan. 7, 1992 and entitled "Glass-melting furnace", all of these U.S. patents being hereby expressly incorporated by reference as if set forth in their entirety herein.

Some examples relating to aluminosilicate, features of which may possibly be incorporated in an embodiment of the present invention may be found in U.S. Pat. No. 4,084,974 issued to Beall et al. on Apr. 18, 1978 and entitled "Method of making light-absorbing glass-ceramic articles"; U.S. Pat. No. 4,530,909 issued to Makishima et al. on Jul. 23, 1985 and entitled "Aluminosilicate glass containing $Y_2O_3$ concentrate and $ZRO_2$"; U.S. Pat. No. 4,626,515 issued to Chyung et al. on Dec. 2, 1986 and entitled "Reinforced alkaline earth aluminosilicate glasses"; U.S. Pat. No. 4,846,866 issued to Chyung et al. on Jul. 11, 1989 and entitled "Providing reinforced alkaline earth aluminosilicate glasses"; and U.S. Pat. No. 6,060,168 issued to Kohli on May 9, 2000 and entitled "Glasses for display panels and photovoltaic devices", all of these U.S. patents being hereby expressly incorporated by reference as if set forth in their entirety herein.

Some examples relating to float glass processes, features of which may possibly be incorporated in an embodiment of the present invention may be found in U.S. Pat. No. 4,305,745 issued to Mouly on Dec. 15, 1981 and entitled "Method of attenuating glass in a float process"; U.S. Pat. No. 4,342,583 issued to Kapura et al. on Aug. 3, 1982 and entitled "Apparatus and method for attenuating floating glass ribbon"; U.S. Pat. No. 4,357,156 issued to Seymour on Nov. 2, 1982 and entitled "Minimizing surface distortion while shaping glass sheets"; U.S. Pat. No. 4,402,722 issued to Edge on Sep. 6, 1983 and entitled "Cooling arrangement and method for forming float glass"; U.S. Pat. No. 4,741,7540 issued to Bricker on May 3, 1988 and entitled "Method an apparatus for cooling in a float glass forming operation"; and U.S. Pat. No. 5,643,349 issued to Piper et al on Jul. 1, 1997 and entitled "Apparatus for applying $SO_3$ to float glass", all of these U.S. patents being hereby expressly incorporated by reference as if set forth in their entirety herein.

Some examples of ceramizing glass-ceramic or glass, features of which may possibly be incorporated in an embodiment of the present invention may be found in U.S. Pat. No. 4,824,463 issued to Neuhoff et al. on Apr. 25, 1989 and entitled "Process for ceramising glass-ceramic sheets"; and U.S. Pat. No. 4,851,022 issued to Günthner on Jul. 25, 1989 and entitled "Method and oven for ceramising glass plates", all of these U.S. patents being hereby expressly incorporated by reference as if set forth in their entirety herein.

Some examples of crystallizable glass and glass-ceramics made therefrom, features of which may possibly be incorporated in an embodiment of the present invention may be found in U.S. Pat. No. 3,970,463 issued to Planchock et al. on Jul. 20, 1976 and entitled "Glasses and glass-ceramics and products made therefrom"; U.S. Pat. No. 4,011,091 issued to McCollister on Mar. 8, 1977 and entitled "Ceramic materials containing keatite"; U.S. Pat. No. 4,100,001 issued to Franklin on Jul. 11, 1978 and entitled "Thermally crystallizable glasses and glass-ceramics made therefrom"; U.S. Pat. No. 4,126,476 issued to Grossman on Nov. 21, 1978 and entitled "Aluminous quartz ceramics and method"; U.S. Pat. No. 4,391,914 issued to Beall et al. on Jul. 5, 1983 and entitled "Strengthened glass-ceramic article and method"; U.S. Pat. No. 6,197,710 B1 issued to Ōhara et al. on Mar. 6, 2001 and entitled "Luminous glass ceramics"; and U.S. Pat. No. 6,204,211 B1 issued to Ōhara et al. on Mar. 20, 2001 and entitled "Luminous glass ceramics", all of these U.S. patents being hereby expressly incorporated by reference as if set forth in their entirety herein.

Some examples of heat reflecting coatings for glass and/or heat reflecting glass, heat resistant glass, and heat-insulating windows or doors that may be utilized or adapted for use in at least one possible embodiment of the present invention may be found in the following U.S. patents: U.S. Pats. No. 4,232,062, having inventors Okino et al., issued on Nov. 4, 1980; U.S. Pat. No. 4,521,454, having inventors Kandachi et al., issued on Jun. 4, 1985; U.S. Pat. No. 5,858,895, having inventors Sagara et al., issued on Jan. 12, 1999; U.S. Pat. No. 5,894,047, having inventor Tanaka, issued on Apr. 13, 1999; U.S. Pat. No. 5,925,583, having inventors Yoshii et al., issued on Jul. 20, 1999; U.S. Pat. No. 5,506,037, having inventor Termath, issued on Apr. 9, 1996; U.S. Pat. No. 5,501,780, having inventors Iida et al., issued on Mar. 26, 1996 and U.S. Pat. No. 5,588,421, having inventors Busch et al., issued on Dec. 31, 1996. The aforementioned patents are hereby incorporated by reference as if set forth in their entirety herein.

Some examples of UV-resistant coatings for glass and/or UV and solar blocking glass that may be utilized or adapted for use in at least one possible embodiment of the present invention may be found in the following U.S. patents: U.S. Pat. No. 6,040,378, having inventors Sanduja et al., issued on Mar. 21, 2000; U.S. Pat. No. 6,190,776 B1, having inventor Demiryont, issued on Feb. 20, 2001; and U.S. Pat. No. 5,925,468, having inventor Stewart, issued on Jul. 20, 1999. The aforementioned patents are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

The invention as described herein above in the context of the preferred embodiments is not to be taken as limited to all of the provided details thereof, since modifications and variations thereof may be made without departing from the spirit and scope of the invention.

What is claimed is:

1. A building for containing human occupants in an adverse Arctic or Antarctic environment, said building comprising:
   at least one covering element to provide at least one roof portion, at least one wall portion, and at least one floor portion, to provide an interior space to contain and protect occupants from an adverse environment about said building;
   said at least one covering element being configured to provide protection to occupants in an adverse Arctic or Antarctic environment;

an opening to permit occupants to ingress into and egress from said building;

an apparatus to close said opening from the outside environment;

a window comprising a frame and at least one pane disposed in said frame;

said window being configured to protect occupants from an adverse Arctic or Antarctic environment;

said at least one pane comprising at least one outer pane disposed to contact the adverse environment about said building and at least one inner pane disposed toward said interior space of said building;

said at least one outer pane comprising an outer surface disposed to contact the adverse environment and an inner surface facing toward said at least one inner pane;

said pane exposed to the environment about said building comprising a transparent glass material;

said transparent glass material comprising glass ceramic;

said glass ceramic comprising a crystallized and ceramicized glass;

said glass ceramic having a coefficient of thermal expansion that is minimized such that said glass ceramic of said at least one outer pane is configured to withstand extreme temperature gradients from said outer surface to said inner surface of said at least one outer pane;

said glass ceramic being configured to resist abrasion;

said abrasion-resistance being configured to minimize pitting and chipping of said at least one outer pane;

at least said outer surface of said at least one outer pane being configured to have a surface roughness which is minimized, thus providing a view through said at least one pane having a distortion which is minimized and providing an easy-to-clean outer surface;

said glass ceramic being substantially free of pits and pores on at least said outer and said inner surfaces;

insulation being configured to protect occupants from adverse temperature conditions from an Arctic or Antarctic environment about said building;

said insulation being disposed with said at least one covering element to provide protection for occupants from adverse temperature conditions about said building; and a heating apparatus to provide heat to said space provided by said at least one covering element, said window, and said insulation in an adverse Arctic or Antarctic environment.

2. The building for containing human occupants in an adverse Arctic or Antarctic environment according to claim 1, wherein:

said at least one outer pane has at least one coating;

said at least one coating is configured to provide at least one of:
   surface reflection reduction;
   heat reflection;
   heat exposure resistance; and
   UV radiation absorption.

3. The building for containing human occupants in an adverse Arctic or Antarctic environment according to claim 2, wherein at least one of:

said at least one outer pane glass ceramic comprises a material free of pores or pits; and said at least one outer glass ceramic pane comprises a polished surface.

4. The building for containing human occupants in an adverse Arctic or Antarctic environment according to claim 3, wherein:

said at least one outer glass ceramic pane has a surface structure with an average roughness less than or equal to two hundredths of a micrometer or a square average roughness less than or equal to one hundredth of a micrometer.

5. The building for containing human occupants in an adverse Arctic or Antarctic environment according to claim 4, comprising at least one of: (A.), (B.), (C.), (D.), (E.), (F.), (G.), and (H.):

(A.) said crystallized and ceramicized glass comprises a reduced-atmosphere poured, floated, thermally pre-stressed glass ceramic;

said glass ceramic comprising high quartz mixed crystals or keatite mixed crystals, and being essentially free of fining agents: arsenic oxide and antimony oxide; and said glass ceramic comprising
   less than 300 parts per billion of platinum (Pt);
   less than 30 parts per billion of rhodium (Rh);
   less than 1.5 weight percent of zinc oxide (ZnO); and
   less than 1 weight percent of tin dioxide ($SnO_2$);

(B.) said crystallized and ceramicized glass comprises a reduced-atmosphere poured, floated, thermally pre-stressed glass ceramic;

said glass ceramic comprising high quartz mixed crystals or keatite mixed crystals, and being essentially free of fining agents: arsenic oxide and antimony oxide; and said glass ceramic comprising
   less than 300 parts per billion of platinum (Pt);
   less than 30 parts per billion of rhodium (Rh);
   less than 1.5 weight percent of zinc oxide (ZnO); and
   less than 1 weight percent of tin dioxide ($SnO_2$); and said glass ceramic comprises an aluminosilicate glass ceramic;

(C.) one of (I.) and (II.):

(I.) said crystallized and ceramicized glass comprises a reduced-atmosphere poured, floated, thermally pre-stressed glass ceramic;

said glass ceramic comprising high quartz mixed crystals or keatite mixed crystals, and being essentially free of fining agents: arsenic oxide and antimony oxide; and said glass ceramic comprising
   less than 300 parts per billion of platinum (Pt);
   less than 30 parts per billion of rhodium (Rh);
   less than 1.5 weight percent of zinc oxide (ZnO); and
   less than 1 weight percent of tin dioxide ($SnO_2$);

said glass ceramic comprises an aluminosilicate glass; and said glass ceramic comprises a composition, in weight % on an oxide basis, of:

| | |
|---|---|
| $Li_2O$ | 3.2 to 5.0 |
| $Na_2O$ | 0 to 1.5 |
| $K_2O$ | 0 to 1.5 |
| $\Sigma Na_2O + K_2O$ | 0.2 to 2.0 |
| MgO | 0.1 to 2.2 |
| CaO | 0 to 1.5 |
| SrO | 0 to 1.5 |
| BaO | 0 to 2.5 |
| ZnO | 0 to less than 1.5 |
| $Al_2O_3$ | 19 to 25 |

-continued

| | |
|---|---|
| $SiO_2$ | 55 to 69 |
| $TiO_2$ | 1.0 to 5.0 |
| $ZrO_2$ | 1.0 to 2.5 |
| $SnO_2$ | 0 to less than 1.0 |
| $\Sigma TiO_2 + ZrO_2 + SnO_2$ | 2.5 to 5.0 |
| $P_2O_5$ | 0 to 3.0 | said glass ceramic comprises colored glass ceramic;
said colored glass ceramic comprises a coloring agent;
said coloring agent comprises at least one compound of: V, Cr, Mn, Fe, Co, Cu, Ni, Se, and Cl; and
(II.) said crystallized and ceramicized glass comprises a reduced-atmosphere poured, floated, chemically prestressed glass ceramic;
said glass ceramic comprising high quartz mixed crystals or keatite mixed crystals, and being essentially free of fining agents: arsenic oxide and antimony oxide; and
said glass ceramic comprising
less than 300 parts per billion of platinum (Pt);
less than 30 parts per billion of rhodium (Rh);
less than 1.5 weight percent of zinc oxide (ZnO); and
less than 1 weight percent of tin dioxide ($SnO_2$);
said glass ceramic comprises an aluminosilicate glass; and
said glass ceramic comprises a composition, in weight % on an oxide basis, of:

| | |
|---|---|
| $Li_2O$ | 3.5 to 4.5 |
| $Na_2O$ | 0.2 to 1.0 |
| $K_2O$ | 0 to 0.8 |
| $\Sigma Na_2O + K_2O$ | 0.4 to 1.5 |
| MgO | 0.3 to 2.0 |
| CaO | 0 to 1.0 |
| SrO | 0 to 1.0 |
| BaO | 0 to 2.5 |
| ZnO | 0 to 1.0 |
| $Al_2O_3$ | 19 to 24 |
| $SiO_2$ | 60 to 68 |
| $TiO_2$ | 1.0 to 2.0 |
| $ZrO_2$ | 1.2 to 2.2 |
| $SnO_2$ | 0 to 0.6 |
| $\Sigma TiO_2 + ZrO_2 + SnO_2$ | 3.0 to 4.5 |
| $P_2O_5$ | 0 to 2.0 | said glass ceramic comprises colored glass ceramic;
said colored glass ceramic comprises a coloring agent;
said coloring agent comprises at least one compound of: V, Cr, Mn, Fe, Co, Cu, Ni, Se, and Cl;
(D.) said crystallized and ceramicized glass comprises a reduced-atmosphere poured, floated, chemically prestressed glass ceramic;
said glass ceramic comprising high quartz mixed crystals or keatite mixed crystals, and being essentially free of fining agents: arsenic oxide and antimony oxide; and
said glass ceramic comprising
less than 300 parts per billion of platinum (Pt);
less than 30 parts per billion of rhodium (Rh);
less than 1.5 weight percent of zinc oxide (ZnO); and
less than 1 weight percent of tin dioxide ($SnO_2$);
said glass ceramic comprises an aluminosilicate glass ceramic; and
said glass ceramic comprises:
the sum of 3.2 times the percentage of zinc oxide (ZnO) and the percentage of titanium dioxide ($TiO_2$) being equal to or less than 4.3 weight percent based on oxide;

(E.) said crystallized and ceramicized glass comprises a reduced-atmosphere poured, floated, chemically prestressed glass ceramic;
said glass ceramic comprising high quartz mixed crystals or keatite mixed crystals, and being essentially free of fining agents: arsenic oxide and antimony oxide; and
said glass ceramic comprising
less than 300 parts per billion of platinum (Pt);
less than 30 parts per billion of rhodium (Rh);
less than 1.5 weight percent of zinc oxide (ZnO); and
less than 1 weight percent of tin dioxide ($SnO_2$);
said glass ceramic comprises an aluminosilicate glass ceramic; and
said glass ceramic comprises less than 200 parts per billion of iron oxide ($Fe_2O_3$) and less than 2.5 weight percent of titanium dioxide ($TiO_2$), on an oxide basis to minimize coloration due to iron oxide and titanium dioxide upon vitrification;
said glass ceramic comprises glass ceramic being configured to have, at a thickness of 4 millimeters, light transmittances of one of:
more than 89%; and
more than 90%;
(F.) said crystallized and ceramicized glass comprises a reduced-atmosphere poured, floated, chemically prestressed glass ceramic;
said glass ceramic comprising high quartz mixed crystals or keatite mixed crystals, and being essentially free of fining agents: arsenic oxide and antimony oxide; and
said glass ceramic comprising
less than 300 parts per billion of platinum (Pt);
less than 30 parts per billion of rhodium (Rh);
less than 1.5 weight percent of zinc oxide (ZnO); and
less than 1 weight percent of tin dioxide ($SnO_2$);
said glass ceramic comprises an aluminosilicate glass ceramic; and
said glass ceramic being configured to have:
a coefficient of thermal expansion $\alpha_{20/300}$ between 3.5 and $5.0 \times 10^{-6}$/K;
a transformation temperature Tg between 600 and 750 degrees Celsius; and
a processing temperature $V_A$ below 1350 degrees Celsius;
(G.) said crystallized and ceramicized glass comprises a reduced-atmosphere poured, floated, chemically prestressed glass ceramic;
said glass ceramic comprising high quartz mixed crystals or keatite mixed crystals, and being essentially free of fining agents: arsenic oxide and antimony oxide; and
said glass ceramic comprising
less than 300 parts per billion of platinum (Pt);
less than 30 parts per billion of rhodium (Rh);
less than 1.5 weight percent of zinc oxide (ZnO); and
less than 1 weight percent of tin dioxide ($SnO_2$);
said glass ceramic comprises an aluminosilicate glass ceramic; and
said glass ceramic comprises keatite mixed crystals as the predominant crystal phase; and
said glass ceramic being configured to have a coefficient of thermal expansion of less than $1.5 \times 10^{-6}$/K; and
(H.) said crystallized and ceramicized glass comprises a reduced-atmosphere poured, floated, chemically prestressed glass ceramic;
said glass ceramic comprising high quartz mixed crystals or keatite mixed crystals, and being essentially free of fining agents: arsenic oxide and antimony oxide; and said glass ceramic comprising
   less than 300 parts per billion of platinum (Pt);
   less than 30 parts per billion of rhodium (Rh);
   less than 1.5 weight percent of zinc oxide (ZnO); and
   less than 1 weight percent of tin dioxide ($SnO_2$);
said glass ceramic comprises an aluminosilicate glass ceramic; and
said glass ceramic comprises high quartz mixed crystals as the predominant crystal phase;
said glass ceramic being configured to have a coefficient of thermal expansion of one of (a.) and (b.):
   (a.) minus 0.3 to $0.3 \times 10^{-6}$/K; and
   (b.) minus 0.15 to $0.15 \times 10^{-6}$/K; and
said glass ceramic being configured to have a light transmittance greater than 80%.

6. The building for containing human occupants in an adverse Arctic or Antarctic environment according to claim 4, comprising all of (A.), (B.), (C.), (D.), (E.), (F.), and (G.):
   (A.) said crystallized and ceramicized glass comprises a reduced-atmosphere poured, floated, thermally pre-stressed glass ceramic;
   said glass ceramic comprising high quartz mixed crystals or keatite mixed crystals, and being essentially free of fining agents: arsenic oxide and antimony oxide; and
   said glass ceramic comprising
      less than 300 parts per billion of platinum (Pt);
      less than 30 parts per billion of rhodium (Rh);
      less than 1.5 weight percent of zinc oxide (ZnO); and
      less than 1 weight percent of tin dioxide ($SnO_2$);
   (B.) said glass ceramic comprises an aluminosilicate glass ceramic;
   (C.) said glass ceramic comprises a composition, in weight % on an oxide basis, of:

| | |
|---|---|
| $Li_2O$ | 3.5 to 4.5 |
| $Na_2O$ | 0.2 to 1.0 |
| $K_2O$ | 0 to 0.8 |
| $\Sigma Na_2O + K_2O$ | 0.4 to 1.5 |
| MgO | 0.3 to 2.0 |
| CaO | 0 to 1.0 |
| SrO | 0 to 1.0 |
| BaO | 0 to 2.5 |
| ZnO | 0 to 1.0 |
| $Al_2O_3$ | 19 to 24 |
| $SiO_2$ | 60 to 68 |
| $TiO_2$ | 1.0 to 2.0 |
| $ZrO_2$ | 1.2 to 2.2 |
| $SnO_2$ | 0 to 0.6 |
| $\Sigma TiO_2 + ZrO_2 + SnO_2$ | 3.0 to 4.5 |
| $P_2O_5$ | 0 to 2.0 | said glass ceramic comprises colored glass ceramic;
   said colored glass ceramic comprises a coloring agent;
   said coloring agent comprises at least one compound of: V, Cr, Mn, Fe, Co, Cu, Ni, Se, and Cl;
   (D.) said glass ceramic comprises:
      the sum of 3.2 times the percentage of zinc oxide (ZnO) and the percentage of titanium dioxide ($TiO_2$) being equal to or less than 4.3 weight percent based on oxide;
   (E.) said glass ceramic comprises less than 200 parts per billion of iron oxide ($Fe_2O_3$) and less than 2.5 weight percent of titanium dioxide ($TiO_2$), on an oxide basis to minimize coloration due to iron oxide and titanium dioxide upon vitrification;
   said glass ceramic comprises glass ceramic being configured to have, at a thickness of 4 millimeters, light transmittances of one of:
      more than 89%; and
      more than 90%;
   (F.) said glass ceramic being configured to have:
      a coefficient of thermal expansion $\alpha_{20/300}$ between 3.5 and $5.0 \times 10^{-6}$/K;
      a transformation temperature Tg between 600 and 750 degrees Celsius; and
      a processing temperature $V_A$ below 1350 degrees Celsius;
   (G.) one of (I.) and (II.):
      (I.) said glass ceramic comprises keatite mixed crystals as the predominant crystal phase; and
         said glass ceramic being configured to have a coefficient of thermal expansion of less than $1.5 \times 10^{-6}$/K; and
      (II.) said glass ceramic comprises high quartz mixed crystals as the predominant crystal phase;
   said glass ceramic being configured to have a coefficient of thermal expansion of one of (a.) and (b.):
      (a.) minus 0.3 to $0.3 \times 10^{-6}$/K; and
      (b.) minus 0.15 to $0.15 \times 10^{-6}$/K; and
   said glass ceramic being configured to have a light transmittance greater than 80%.

7. A glass ceramic window glazing unit in a polar Arctic or Antarctic station configured to be exposed to an extreme adverse environment about a station in a polar Arctic or Antarctic region, said glass ceramic window glazing unit comprising:
   at least one outer pane being configured to be exposed to an extreme adverse environment in a polar Arctic or Antarctic region about a polar Arctic or Antarctic station;
   at least one inner pane being configured to be disposed toward an interior space of a polar Arctic or Antarctic station;
   said at least one outer pane being configured to be disposed a distance from said at least one inner pane;
   a spacing arrangement being configured to dispose and disposing said at least one outer pane a distance from said at least one inner pane;
   an installation arrangement being configured to install said glass ceramic window glazing unit in a polar Arctic or Antarctic station;
   said at least one outer pane comprising glass ceramic;
   said glass ceramic comprising a crystallized and ceramicized glass;
   said at least one outer glass ceramic pane being configured to withstand a temperature gradient from the outer surface to the inner surface of said at least one outer glass ceramic pane, due to extremes of temperature in a polar Arctic or Antarctic region about a polar Arctic or Antarctic station; and
   said glass ceramic window glazing unit being configured:
      to permit said glass ceramic window glazing unit, upon being exposed an extreme adverse environment about a polar Arctic or Antarctic station in a polar Arctic or Antarctic region, to withstand thermo-mechanical stresses, due to extremes of temperature in a polar Arctic or Antarctic region, and due to changes of temperature in a polar Arctic or Antarctic region and from transitions of temperature at the exterior of said glass ceramic window glazing unit in a polar Arctic or Antarctic region about a polar Arctic or Antarctic station;
      to permit said glass ceramic window glazing unit to withstand pressure differentials upon said glass ceramic window glazing unit in a polar Arctic or Antarctic region about a polar Arctic or Antarctic station;

to provide sufficient hardness and mechanical strength against impacts on said glass ceramic window glazing unit in a polar Arctic or Antarctic region about a polar Arctic or Antarctic station; and to minimize distortions of views through said glass ceramic window glazing unit in a polar Arctic or Antarctic region; and said glass ceramic window glazing unit being configured with a surface being configured to maximize ease of cleaning of the exterior surface of said at least one outer glass ceramic pane.

8. The glass ceramic window glazing unit in a polar Arctic or Antarctic station for containing human occupants in an adverse Arctic or Antarctic environment, according to claim 7, wherein:

said at least one outer pane has at least one coating;

said at least one coating is configured to provide at least one of:
surface reflection reduction;
heat reflection;
heat exposure resistance; and
UV radiation absorption.

9. The glass ceramic window glazing unit in a polar Arctic or Antarctic station for containing human occupants in an adverse Arctic or Antarctic environment, according to claim 8, wherein at least one of:

said at least one outer pane glass ceramic comprises a material free of pores or pits; and said at least one outer glass ceramic pane comprises a polished surface.

10. The glass ceramic window glazing unit in a polar Arctic or Antarctic station for containing human occupants in an adverse Arctic or Antarctic environment, according to claim 9, wherein:

said at least one outer glass ceramic pan has a surface structure with an average roughness less than or equal to two hundredths of a micrometer or an square average roughness less than or equal to one hundredth of a micrometer.

11. The glass ceramic window glazing unit in a polar Arctic or Antarctic station for containing human occupants in an adverse Arctic or Antarctic environment, according to claim 10, wherein:

said crystallized and ceramicized glass comprises a reduced-atmosphere poured, floated, thermally pre-stressed glass ceramic;

said glass ceramic comprising high quartz mixed crystals or keatite mixed crystals, and being essentially free of fining agents: arsenic oxide and antimony oxide; and said glass ceramic comprising
less than 300 parts per billion of platinum (Pt);
less than 30 parts per billion of rhodium (Rh);
less than 1.5 weight percent of zinc oxide (ZnO); and
less than 1 weight percent of tin dioxide ($SnO_2$).

12. The glass ceramic window glazing unit in a polar Arctic or Antarctic station for containing human occupants in an adverse Arctic or Antarctic environment, according to claim 11, comprising at least one of: (A.), (B.), (C.), (D.), (E.), (F.), and (G.):

(A.) said glass ceramic comprises an aluminosilicate glass ceramic;

(B.) one of (I.) and (II.):

(I.) said glass ceramic comprises a composition, in weight % on an oxide basis, of:

| | |
|---|---|
| $Li_2O$ | 3.2 to 5.0 |
| $Na_2O$ | 0 to 1.5 |
| $K_2O$ | 0 to 1.5 |
| $\Sigma Na_2O + K_2O$ | 0.2 to 2.0 |
| MgO | 0.1 to 2.2 |
| CaO | 0 to 1.5 |
| SrO | 0 to 1.5 |
| BaO | 0 to 2.5 |
| ZnO | 0 to less than 1.5 |
| $Al_2O_3$ | 19 to 25 |
| $SiO_2$ | 55 to 69 |
| $TiO_2$ | 1.0 to 5.0 |
| $ZrO_2$ | 1.0 to 2.5 |
| $SnO_2$ | 0 to less than 1.0 |
| $\Sigma TiO_2 + ZrO_2 + SnO_2$ | 2.5 to 5.0 |
| $P_2O_5$ | 0 to 3.0 | said glass ceramic comprises colored glass ceramic;
said colored glass ceramic comprises a coloring agent;
said coloring agent comprises at least one compound of: V, Cr, Mn, Fe, Co, Cu, Ni, Se, and Cl; and (II.) said glass ceramic comprises a composition, in weight % on an oxide basis, of:

| | |
|---|---|
| $Li_2O$ | 3.5 to 4.5 |
| $Na_2O$ | 0.2 to 1.0 |
| $K_2O$ | 0 to 0.8 |
| $\Sigma Na_2O + K_2O$ | 0.4 to 1.5 |
| MgO | 0.3 to 2.0 |
| CaO | 0 to 1.0 |
| SrO | 0 to 1.0 |
| BaO | 0 to 2.5 |
| ZnO | 0 to 1.0 |
| $Al_2O_3$ | 19 to 24 |
| $SiO_2$ | 60 to 68 |
| $TiO_2$ | 1.0 to 2.0 |
| $ZrO_2$ | 1.2 to 2.2 |
| $SnO_2$ | 0 to 0.6 |
| $\Sigma TiO_2 + ZrO_2 + SnO_2$ | 3.0 to 4.5 |
| $P_2O_5$ | 0 to 2.0 | said glass ceramic comprises colored glass ceramic;
said colored glass ceramic comprises a coloring agent;
said coloring agent comprises at least one compound of: V, Cr, Mn, Fe, Co, Cu, Ni, Se, and Cl;

(C.) said glass ceramic comprises:
the sum of 3.2 times the percentage of zinc oxide (ZnO) and the percentage of titanium dioxide ($TiO_2$) being equal to or less than 4.3 weight percent based on oxide;

(D.) said glass ceramic comprises less than 200 parts per billion of iron oxide ($Fe_2O_3$) and less than 2.5 weight percent of titanium dioxide ($TiO_2$), on an oxide basis to minimize coloration due to iron oxide and titanium dioxide upon vitrification;

said glass ceramic comprises glass ceramic being configured to have, at a thickness of 4 millimeters, light transmittances of one of:
more than 89%; and
more than 90%;

(E.) said glass ceramic being configured to have:
a coefficient of thermal expansion $\alpha_{20/300}$ between 3.5 and $5.0 \times 10^{-6}$/K;
a transformation temperature Tg between 600 and 750 degrees Celsius; and
a processing temperature $V_A$ below 1350 degrees Celsius;

(F.) said glass ceramic comprises keatite mixed crystals as the predominant crystal phase; and said glass ceramic being configured to have a coefficient of thermal expansion of less than $1.5 \times 10^{-6}$/K; and (G.) said glass ceramic comprises high quartz mixed crystals as the predominant crystal phase;

said glass ceramic being configured to have a coefficient of one of (a.) and (b.):

(a.) minus 0.3 to $0.3 \times 10^{-6}$/K; and (b.) minus 0.15 to $0.15 \times 10^{-6}$/K; and said glass ceramic being configured to have a light transmittance greater than 80%.

13. The glass ceramic window glazing unit in a polar Arctic or Antarctic station for containing human occupants in an adverse Arctic or Antarctic environment, according to claim 11, comprising all of (A.), (B.), (C.), (D.), (E.), and (F.):

(A.) said glass ceramic comprises an aluminosilicate glass ceramic;

(B.) said glass ceramic comprises a composition, in weight % on an oxide basis, of:

| | |
|---|---|
| $Li_2O$ | 3.5 to 4.5 |
| $Na_2O$ | 0.2 to 1.0 |
| $K_2O$ | 0 to 0.8 |
| $\Sigma Na_2O + K_2O$ | 0.4 to 1.5 |
| MgO | 0.3 to 2.0 |
| CaO | 0 to 1.0 |
| SrO | 0 to 1.0 |
| BaO | 0 to 2.5 |
| ZnO | 0 to 1.0 |
| $Al_2O_3$ | 19 to 24 |
| $SiO_2$ | 60 to 68 |
| $TiO_2$ | 1.0 to 2.0 |
| $ZrO_2$ | 1.2 to 2.2 |
| $SnO_2$ | 0 to 0.6 |
| $\Sigma TiO_2 + ZrO_2 + SnO_2$ | 3.0 to 4.5 |
| $P_2O_5$ | 0 to 2.0 | said glass ceramic comprises colored glass ceramic;
said colored glass ceramic comprises a coloring agent;
said coloring agent comprises at least one compound of: V, Cr, Mn, Fe, Co, Cu, Ni, Se, and Cl;

(C.) said glass ceramic comprises:
the sum of 3.2 times the percentage of zinc oxide (ZnO) and the percentage of titanium dioxide ($TiO_2$) being equal to or less than 4.3 weight percent based on oxide;

(D.) said glass ceramic comprises less than 200 parts per billion of iron oxide ($Fe_2O_3$) and less than 2.5 weight percent of titanium dioxide ($TiO_2$), on an oxide basis to minimize coloration due to iron oxide and titanium dioxide upon vitrification;

said glass ceramic comprises glass ceramic being configured to have, at a thickness of 4 millimeters, light transmittances of one of:
more than 89%; and
more than 90%;

(E.) said glass ceramic being configured to have:
a coefficient of thermal expansion $\alpha_{20/300}$ between 3.5 and $5.0 \times 10^{-6}$/K;
a transformation temperature Tg between 600 and 750 degrees Celsius; and
a processing temperature $V_A$ below 1350 degrees Celsius;

(F.) one of (I.) and (II.):

(I.) said glass ceramic comprises keatite mixed crystals as the predominant crystal phase; and said glass ceramic being configured to have a coefficient of thermal expansion of less than $1.5 \times 10^{-6}$/K; and (II.) said glass ceramic comprises high quartz mixed crystals as the predominant crystal phase;

said glass ceramic being configured to have a coefficient of thermal expansion of one of (a.) and (b.):

(a.) minus 0.3 to $0.3 \times 10^{-6}$/K; and (b.) minus 0.15 to $0.15 \times 10^{-6}$/K; and said glass ceramic being configured to have a light transmittance greater than 80%.

14. A glass ceramic window glazing unit in a spacecraft configured to be exposed to an adverse environment about a spacecraft in space, said glass ceramic window glazing unit comprising:

at least one outer pane being configured to be exposed to an adverse environment about a spacecraft in space;

at least one inner pane being configured to be disposed toward an interior space of a spacecraft;

said at least one outer pane being configured to be disposed a distance from said at least one inner pane;

a spacing arrangement being configured to dispose and disposing said at least one outer pane a distance from said at least one inner pane; and an installation arrangement being configured to install said glass ceramic window glazing unit in a spacecraft;

said at least one outer pane comprising glass ceramic;

said glass ceramic comprising a crystallized and ceramicized glass;

said crystallized and ceramicized glass having a surface being configured to be sufficiently smooth, to minimize distortions of views through said glass ceramic window glazing unit in space, by said surface of said crystallized and ceramicized glass being polished, or by said surface of said crystallized and ceramicized glass being free from metallic precipitations in said surface of said crystallized and ceramicized glass to thus minimize distorting glass ceramic crystals in said at least one outer glass ceramic pane, and said surface of said crystallized and ceramicized glass being configured to maximize ease of cleaning of said at least one outer glass ceramic pane comprising crystallized and ceramicized glass;

said glass ceramic window glazing unit being:
configured to withstand a temperature gradient from the outer surface to the inner surface of said at least one outer glass ceramic pane comprising crystallized and ceramicized glass, due to extremes of temperature in space from a sun side of a spacecraft in space to a shadow side of a spacecraft in space;

configured with sufficient hardness and mechanical strength against impact of abrasive media on said glass ceramic window glazing unit in space about a spacecraft in space;

configured to permit said glass ceramic window glazing unit, upon being exposed to an adverse environment about a spacecraft in space, to withstand thermo-mechanical stresses, due to extremes of temperature in space from a sun side of a spacecraft to a shadow side of a spacecraft, and due to changes of temperature in space and from transitions of temperature at the exterior of said glass ceramic window glazing unit in space about a spacecraft in space; and configured to permit said glass ceramic window glazing unit to withstand pressure differentials upon said glass ceramic window glazing unit in space about a spacecraft in space.

15. The glass ceramic window glazing unit in a spacecraft configured to be exposed to an adverse environment about a spacecraft in space, according to claim 14, wherein:

said at least one outer pane has at least one coating;

said at least one coating is configured to provide at least one of:
- surface reflection reduction;
- heat reflection;
- heat exposure resistance; and
- UV radiation absorption.

16. The glass ceramic window glazing unit in a spacecraft configured to be exposed to an adverse environment about a spacecraft in space, according to claim 15, wherein at least one of:

said at least one outer pane glass ceramic comprises a material free of pores or pits; and said at least one outer glass ceramic pane comprises a polished surface.

17. The glass ceramic window glazing unit in a spacecraft configured to be exposed to an adverse environment about a spacecraft in space, according to claim 16, wherein:

said at least one outer glass ceramic pane has a surface structure with an average roughness less than or equal to two hundredths of a micrometer or an square average roughness less than or equal to one hundredth of a micrometer.

18. The glass ceramic window glazing unit in a spacecraft to be exposed to an adverse environment about a spacecraft in space, according to claim 17, wherein:

said crystallized and ceramicized glass comprises a reduced-atmosphere poured, floated, thermally pre-stressed glass ceramic;

said glass ceramic comprising high quartz mixed crystals or keatite mixed crystals, and being essentially free of fining agents:

arsenic oxide and antimony oxide; and said glass ceramic comprising
- less than 300 parts per billion of platinum (Pt);
- less than 30 parts per billion of rhodium (Rh);
- less than 1.5 weight percent of zinc oxide (ZnO); and
- less than 1 weight percent of tin dioxide ($SnO_2$).

19. The glass ceramic window glazing unit in a spacecraft configured to be exposed to an adverse environment about a spacecraft in space, according to claim 18, comprising at least one of: (A.), (B.), (C.), (D.), (E.), (F.), and (G.):

(A.) said glass ceramic comprises an aluminosilicate glass ceramic;

(B.) one of (I.) and (II.):

(I.) said glass ceramic comprises a composition, in weight % on an oxide basis, of:

| | |
|---|---|
| $Li_2O$ | 3.2 to 5.0 |
| $Na_2O$ | 0 to 1.5 |
| $K_2O$ | 0 to 1.5 |
| $\Sigma Na_2O + K_2O$ | 0.2 to 2.0 |
| MgO | 0.1 to 2.2 |
| CaO | 0 to 1.5 |
| SrO | 0 to 1.5 |
| BaO | 0 to 2.5 |
| ZnO | 0 to less than 1.5 |
| $Al_2O_3$ | 19 to 25 |
| $SiO_2$ | 55 to 69 |
| $TiO_2$ | 1.0 to 5.0 |
| $ZrO_2$ | 1.0 to 2.5 |
| $SnO_2$ | 0 to less than 1.0 |
| $\Sigma TiO_2 + ZrO_2 + SnO_2$ | 2.5 to 5.0 |
| $P_2O_5$ | 0 to 3.0 | said glass ceramic comprises colored glass ceramic;
said colored glass ceramic comprises a coloring agent;
said coloring agent comprises at least one compound of: V, Cr, Mn, Fe, Co, Cu, Ni, Se, and Cl; and (II.) said glass ceramic comprises a composition, in weight % on an oxide basis, of:

| | |
|---|---|
| $Li_2O$ | 3.5 to 4.5 |
| $Na_2O$ | 0.2 to 1.0 |
| $K_2O$ | 0 to 0.8 |
| $\Sigma Na_2O + K_2O$ | 0.4 to 1.5 |
| MgO | 0.3 to 2.0 |
| CaO | 0 to 1.0 |
| SrO | 0 to 1.0 |
| BaO | 0 to 2.5 |
| ZnO | 0 to 1.0 |
| $Al_2O_3$ | 19 to 24 |
| $SiO_2$ | 60 to 68 |
| $TiO_2$ | 1.0 to 2.0 |
| $ZrO_2$ | 1.2 to 2.2 |
| $SnO_2$ | 0 to 0.6 |
| $\Sigma TiO_2 + ZrO_2 + SnO_2$ | 3.0 to 4.5 |
| $P_2O_5$ | 0 to 2.0 | said glass ceramic comprises colored glass ceramic;
said colored glass ceramic comprises a coloring agent;
said coloring agent comprises at least one compound of: V, Cr, Mn, Fe, Co, Cu, Ni, Se, and Cl;

(C.) said glass ceramic comprises:

the sum of 3.2 times the percentage of zinc oxide (ZnO) and the percentage of titanium dioxide ($TiO_2$) being equal to or less than 4.3 weight percent based on oxide;

(D.) said glass ceramic comprises less than 200 parts per billion of iron oxide ($Fe_2O_3$) and less than 2.5 weight percent of titanium dioxide ($TiO_2$), on an oxide basis to minimize coloration due to iron oxide and titanium dioxide upon vitrification;

said glass ceramic comprises glass ceramic being configured to have, at a thickness of 4 millimeters, light transmittances of one of:
- more than 89%; and
- more than 90%;

(E.) said glass ceramic being configured to have:
- a coefficient of thermal expansion $\alpha_{20/300}$ between 3.5 and $5.0 \times 10^{-6}$/K;
- a transformation temperature Tg between 600 and 750 degrees Celsius; and
- a processing temperature $V_A$ below 1350 degrees Celsius;

(F.) said glass ceramic comprises keatite mixed crystals as the predominant crystal phase; and said glass ceramic being configured to have a coefficient of thermal expansion of less than $1.5 \times 10^{-6}$/K; and (G.) said glass ceramic comprises high quartz mixed crystals as the predominant crystal phase;

said glass ceramic being configured to have a coefficient of thermal expansion of one of (a.) and (b.):
(a.) minus 0.3 to 0.3×10$^{-6}$/K; and
(b.) minus 0.15 to 0.15×10$^{-6}$/K; and
said glass ceramic being configured to have a light transmittance greater than 80%.

20. The glass ceramic window glazing unit in a spacecraft configured to be exposed to an adverse environment about a spacecraft in space, according to claim 18, comprising all of (A.), (B.), (C.), (D.), (E.), and (F.):
(A.) said glass ceramic comprises an aluminosilicate glass ceramic;
(B.) said glass ceramic comprises a composition, in weight % on an oxide basis, of:

| | |
|---|---|
| Li$_2$O | 3.5 to 4.5 |
| Na$_2$O | 0.2 to 1.0 |
| K$_2$O | 0 to 0.8 |
| ΣNa$_2$O + K$_2$O | 0.4 to 1.5 |
| MgO | 0.3 to 2.0 |
| CaO | 0 to 1.0 |
| SrO | 0 to 1.0 |
| BaO | 0 to 2.5 |
| ZnO | 0 to 1.0 |
| Al$_2$O$_3$ | 19 to 24 |
| SiO$_2$ | 60 to 68 |
| TiO$_2$ | 1.0 to 2.0 |
| ZrO$_2$ | 1.2 to 2.2 |
| SnO$_2$ | 0 to 0.6 |
| ΣTiO$_2$ + ZrO$_2$ + SnO$_2$ | 3.0 to 4.5 |
| P$_2$O$_5$ | 0 to 2.0 | said glass ceramic comprises colored glass ceramic;
said colored glass ceramic comprises a coloring agent;
said coloring agent comprises at least one compound of: V, Cr, Mn, Fe, Co, Cu, Ni, Se, and Cl;
(C.) said glass ceramic comprises:
the sum of 3.2 times the percentage of zinc oxide (ZnO) and the percentage of titanium dioxide (TiO$_2$) being equal to or less than 4.3 weight percent based on oxide;
(D.) said glass ceramic comprises less than 200 parts per billion of iron oxide (Fe$_2$O$_3$) and less than 2.5 weight percent of titanium dioxide (TiO$_2$), on an oxide basis to minimize coloration due to iron oxide and titanium dioxide upon vitrification;
said glass ceramic comprises glass ceramic being configured to have, at a thickness of 4 millimeters, light transmittances of one of:
more than 89%; and
more than 90%;
(E.) said glass ceramic being configured to have:
a coefficient of thermal expansion α$_{20/300}$ between 3.5 and 5.0×10$^{-6}$/K;
a transformation temperature Tg between 600 and 750 degrees Celsius; and
a processing temperature V$_A$ below 1350 degrees Celsius; (F.) one of (I.) and (II.):
(I.) said glass ceramic comprises keatite mixed crystals as the predominant crystal phase; and
said glass ceramic being configured to have a coefficient of thermal expansion of less than 1.5×10$^{-6}$/K; and
(II.) said glass ceramic comprises high quartz mixed crystals as the predominant crystal phase;
said glass ceramic being configured to have a coefficient of thermal expansion of one of (a.) and (b.):
(a.) minus 0.3 to 0.3×10$^{-6}$/K; and
(b.) minus 0.15 to 0.15×10$^{-6}$/K; and
said glass ceramic being configured to have a light transmittance greater than 80%.

21. A glass ceramic window glazing unit of a spacecraft configured to be exposed to an extreme adverse environment in space and configured to withstand a temperature gradient from the outer surface to the inner surface due to extremes of temperature in space from a sun side of a spacecraft in space to a shadow side of a spacecraft in space, said glass ceramic window glazing unit comprising:
a plurality of transparent panes comprising at least an inner pane and an outer pane;
said outer pane being configured to be disposed to face an extreme adverse environment about a spacecraft, and comprising glass ceramic, said glass ceramic comprising a crystallized and ceramicized glass; and
said outer glass ceramic pane being configured to withstand a temperature gradient from the outer surface to the inner surface of said at least one outer glass ceramic pane due to extremes of temperature in space from a sun side of a spacecraft in space to a shadow side of a spacecraft in space.

22. The glass ceramic window glazing unit of a spacecraft according to claim 21, including one of (i), (ii), (iii), (iv), (v), (vi), (vii), or (viii), wherein (i), (ii), (iii), (iv), (v), (vi), (vii), and (viii) are:
(i) said plurality of transparent panes comprises at least one inner pane and at least one outer pane;
said at least one inner pane is configured to be disposed toward an interior space of a spacecraft;
said at least one outer pane is configured to be disposed a distance from said at least one inner pane;
a spacing arrangement is configured to dispose and disposing said at least one outer pane a distance from said at least one inner pane; and
an installation arrangement is configured to install said glass ceramic window glazing unit in a spacecraft;
(ii) said at least one outer pane has at least one coating; and
said at least one coating is configured to provide at least one of:
surface reflection reduction;
heat reflection;
heat exposure resistance; and
UV radiation absorption;
(iii) said at least one outer glass ceramic pane comprises at least one of:
a material free of pores or pits; and
a polished surface;
(iv) said at least one outer glass ceramic pane has a surface structure with an average roughness less than or equal to two hundredths of a micrometer or an square average roughness less than or equal to one hundredth of a micrometer;
(v) said crystallized and ceramicized glass comprises a reduced-atmosphere poured, floated, thermally pre-stressed glass ceramic;
said glass ceramic comprises high quartz mixed crystals or keatite mixed crystals, and being essentially free of fining agents: arsenic oxide and antimony oxide; and
said glass ceramic comprises:
less than 300 parts per billion of platinum (Pt);
less than 30 parts per billion of rhodium (Rh);

less than 1.5 weight percent of zinc oxide (ZnO); and less than 1 weight percent of tin dioxide (SnO$_2$);

(vi) said glass ceramic window glazing unit comprises at least one of: (A.), (B.), (C.), (D.), (E.), (F.), and (G.):
  (A.) said glass ceramic comprises an aluminosilicate glass ceramic;
  (B.) one of (I.) and (II.):
    (I.) said glass ceramic comprises a composition, in weight % on an oxide basis, of:

| | |
|---|---|
| Li$_2$O | 3.2 to 5.0 |
| Na$_2$O | 0 to 1.5 |
| K$_2$O | 0 to 1.5 |
| ΣNa$_2$O + K$_2$O | 0.2 to 2.0 |
| MgO | 0.1 to 2.2 |
| CaO | 0 to 1.5 |
| SrO | 0 to 1.5 |
| BaO | 0 to 2.5 |
| ZnO | 0 to less than 1.5 |
| Al$_2$O$_3$ | 19 to 25 |
| SiO$_2$ | 55 to 69 |
| TiO$_2$ | 1.0 to 5.0 |
| ZrO$_2$ | 1.0 to 2.5 |
| SnO$_2$ | 0 to less than 1.0 |
| ΣTiO$_2$ + ZrO$_2$ + SnO$_2$ | 2.5 to 5.0 |
| P$_2$O$_5$ | 0 to 3.0 | said glass ceramic comprises colored glass ceramic;
said colored glass ceramic comprises a coloring agent;
said coloring agent comprises at least one compound of: V, Cr, Mn, Fe, Co, Cu, Ni, Se, and Cl; and
  (II.) said glass ceramic comprises a composition, in weight % on an oxide basis, of:

| | |
|---|---|
| Li$_2$O | 3.5 to 4.5 |
| Na$_2$O | 0.2 to 1.0 |
| K$_2$O | 0 to 0.8 |
| ΣNa$_2$O + K$_2$O | 0.4 to 1.5 |
| MgO | 0.3 to 2.0 |
| CaO | 0 to 1.0 |
| SrO | 0 to 1.0 |
| BaO | 0 to 2.5 |
| ZnO | 0 to 1.0 |
| Al$_2$O$_3$ | 19 to 24 |
| SiO$_2$ | 60 to 68 |
| TiO$_2$ | 1.0 to 2.0 |
| ZrO$_2$ | 1.2 to 2.2 |
| SnO$_2$ | 0 to 0.6 |
| ΣTiO$_2$ + ZrO$_2$ + SnO$_2$ | 3.0 to 4.5 |
| P$_2$O$_5$ | 0 to 2.0 | said glass ceramic comprises colored glass ceramic;
said colored glass ceramic comprises a coloring agent;
said coloring agent comprises at least one compound of: V, Cr, Mn, Fe, Co, Cu, Ni, Se, and Cl;
  (C.) said glass ceramic comprises:
    the sum of 3.2 times the percentage of zinc oxide (ZnO) and the percentage of titanium dioxide (TiO$_2$) being equal to or less than 4.3 weight percent based on oxide;
  (D.) said glass ceramic comprises less than 200 parts per billion of iron oxide (Fe$_2$O$_3$) and less than 2.5 weight percent of titanium dioxide (TiO$_2$), on an oxide basis to minimize coloration due to iron oxide and titanium dioxide upon vitrification;
  said glass ceramic comprises glass ceramic being configured to have, at a thickness of 4 millimeters, light transmittances of one of:
    more than 89%; and
    more than 90%;
  (E.) said glass ceramic being configured to have:
    a coefficient of thermal expansion $\alpha_{20/300}$ between 3.5 and $5.0 \times 10^{-6}$/K;
    a transformation temperature Tg between 600 and 750 degrees Celsius; and
    a processing temperature $V_A$ below 1350 degrees Celsius;
  (F.) said glass ceramic comprises keatite mixed crystals as the predominant crystal phase; and
  said glass ceramic being configured to have a coefficient of thermal expansion of less than $1.5 \times 10^{-6}$/K; and
  (G.) said glass ceramic comprises high quartz mixed crystals as the predominant crystal phase;
  said glass ceramic being configured to have a coefficient of thermal expansion of one of (a.) and (b.):
    (a.) minus 0.3 to $0.3 \times 10^{-6}$/K; and
    (b.) minus 0.15 to $0.15 \times 10^{-6}$/K; and
  said glass ceramic being configured to have a light transmittance greater than 80%;

(vii) said glass ceramic window glazing unit comprises all of (A.), (B.), (C.), (D.), (E.), and (F.):
  (A.) said glass ceramic comprises an aluminosilicate glass ceramic;
  (B.) said glass ceramic comprises a composition, in weight % on an oxide basis, of:

| | |
|---|---|
| Li$_2$O | 3.5 to 4.5 |
| Na$_2$O | 0.2 to 1.0 |
| K$_2$O | 0 to 0.8 |
| ΣNa$_2$O + K$_2$O | 0.4 to 1.5 |
| MgO | 0.3 to 2.0 |
| CaO | 0 to 1.0 |
| SrO | 0 to 1.0 |
| BaO | 0 to 2.5 |
| ZnO | 0 to 1.0 |
| Al$_2$O$_3$ | 19 to 24 |
| SiO$_2$ | 60 to 68 |
| TiO$_2$ | 1.0 to 2.0 |
| ZrO$_2$ | 1.2 to 2.2 |
| SnO$_2$ | 0 to 0.6 |
| ΣTiO$_2$ + ZrO$_2$ + SnO$_2$ | 3.0 to 4.5 |
| P$_2$O$_5$ | 0 to 2.0 | said glass ceramic comprises colored glass ceramic;
said colored glass ceramic comprises a coloring agent;
said coloring agent comprises at least one compound of: V, Cr, Mn, Fe, Co, Cu, Ni, Se, and Cl;
  (C.) said glass ceramic comprises:
    the sum of 3.2 times the percentage of zinc oxide (ZnO) and the percentage of titanium dioxide (TiO$_2$) being equal to or less than 4.3 weight percent based on oxide;
  (D.) said glass ceramic comprises less than 200 parts per billion of iron oxide (Fe$_2$O$_3$) and less than 2.5 weight percent of titanium dioxide (TiO$_2$), on an oxide basis to minimize coloration due to iron oxide and titanium dioxide upon vitrification;
  said glass ceramic comprises glass ceramic being configured to have, at a thickness of 4 millimeters, light transmittances of one of:
    more than 89%; and
    more than 90%;
  (E.) said glass ceramic being configured to have:
    a coefficient of thermal expansion $\alpha_{20/300}$ between 3.5 and $5.0 \times 10^{-6}$/K;

a transformation temperature Tg between 600 and 750 degrees Celsius; and
a processing temperature $V_A$ below 1350 degrees Celsius;
(F.) one of (I.) and (II.):
(I.) said glass ceramic comprises keatite mixed crystals as the predominant crystal phase; and
said glass ceramic being configured to have a coefficient of thermal expansion of less than $1.5 \times 10^{-6}$/K; and
(II.) said glass ceramic comprises high quartz mixed crystals as the predominant crystal phase;
said glass ceramic being configured to have a coefficient of thermal expansion of one of (a.) and (b.):
(a.) minus 0.3 to $0.3 \times 10^{-6}$/K; and
(b.) minus 0.15 to $0.15 \times 10^{-6}$/K; and
said glass ceramic being configured to have a light transmittance greater than 80%; and
(viii) said crystallized and ceramicized glass has a surface being configured to be sufficiently smooth, to minimize distortions of views through said glass ceramic window glazing unit in space, by said surface of said crystallized and ceramicized glass being polished, or by said surface of said crystallized and ceramicized glass being free from metallic precipitations in said surface of said crystallized and ceramicized glass to thus minimize distorting glass ceramic crystals in said at least one outer glass ceramic pane, and said surface of said crystallized and ceramicized glass being configured to maximize ease of cleaning of said at least one outer glass ceramic pane comprising crystallized and ceramicized glass; and
said glass ceramic window glazing unit is:
configured with sufficient hardness and mechanical strength against impact of abrasive media on said glass ceramic window glazing unit in space about a spacecraft in space;
configured to permit said glass ceramic window glazing unit, upon being exposed to an adverse environment about a spacecraft in space, to withstand thermo-mechanical stresses, due to extremes of temperature in space from a sun side of a space craft to a shadow side of a spacecraft, and due to changes of temperature in space and from transitions of temperature at the exterior of said glass ceramic window glazing unit in space about a spacecraft in space; and
configured to permit said glass ceramic window glazing unit to withstand pressure differentials upon said glass ceramic window glazing unit in space about a spacecraft in space.

23. A glass ceramic window glazing unit of a polar Arctic or Antarctic building configured to be exposed to an extreme adverse environment in a polar Arctic or Antarctic region and configured to withstand a temperature gradient from the outer surface to the inner surface due to extremes of temperature in a polar Arctic or Antarctic region about a polar Arctic or Antarctic building, said glass ceramic window glazing unit comprising:
a plurality of transparent panes comprising at least an inner pane and an outer pane;
said outer pane being configured to be disposed to face an extreme adverse environment about a polar Arctic or Antarctic building, and comprising glass ceramic, said glass ceramic comprising a crystallized and ceramicized glass; and
said outer glass ceramic pane being configured to withstand a temperature gradient from the outer surface to the inner surface of said outer glass ceramic pane, due to extremes of temperature in a polar Arctic or Antarctic region about a polar Arctic or Antarctic building.

24. The glass ceramic window glazing unit of a polar Arctic or Antarctic station according to claim 22, including one of (i), (ii), (iii), (iv), (v), (vi), (vii), or (viii), wherein (i), (ii), (iii), (iv), (v), (vi), (vii), and (viii) are:
(i) said plurality of panes comprises at least one inner pane and at least one outer pane;
at least one inner pane is configured to be disposed toward an interior space of a polar Arctic or Antarctic station;
said at least one outer pane is configured to be disposed a distance from said at least one inner pane;
a spacing arrangement is configured to dispose and disposing said at least one outer pane a distance from said at least one inner pane; and
an installation arrangement is configured to install said glass ceramic window glazing unit in a polarArctic or Antarctic station;
(ii) said at least one outer pane has at least one coating;
said at least one coating is configured to provide at least one of:
surface reflection reduction;
heat reflection;
heat exposure resistance; and
UV radiation absorption;
(iii) said at least one outer pane glass ceramic comprises at least one of:
a material free of pores or pits; and
a polished surface;
(iv) said at least one outer glass ceramic pane has a surface structure with an average roughness less than or equal to two hundredths of a micrometer or an square average roughness less than or equal to one hundredth of a micrometer;
(v) said crystallized and ceramicized glass comprises a reduced-atmosphere poured, floated, thermally prestressed glass ceramic;
said glass ceramic comprises high quartz mixed crystals or keatite mixed crystals, and being essentially free of fining agents: arsenic oxide and antimony oxide; and
said glass ceramic comprises:
less than 300 parts per billion of platinum (Pt);
less than 30 parts per billion of rhodium (Rh);
less than 1.5 weight percent of zinc oxide (ZnO); and
less than 1 weight percent of tin dioxide ($SnO_2$);
(vi) said glass ceramic window glazing unit comprises at least one of (A.), (B.), (C.), (D.), (E.), (F.), and (G.):
(A.) said glass ceramic comprises an aluminosilicate glass ceramic;
(B.) one of (I.) and (II.):
(I.) said glass ceramic comprises a composition, in weight % on an oxide basis, of:

| | |
|---|---|
| $Li_2O$ | 3.2 to 5.0 |
| $Na_2O$ | 0 to 1.5 |
| $K_2O$ | 0 to 1.5 |
| $\Sigma Na_2O + K_2O$ | 0.2 to 2.0 |
| MgO | 0.1 to 2.2 |
| CaO | 0 to 1.5 |
| SrO | 0 to 1.5 |
| BaO | 0 to 2.5 |
| ZnO | 0 to less than 1.5 |

-continued

| | |
|---|---|
| $Al_2O_3$ | 19 to 25 |
| $SiO_2$ | 55 to 69 |
| $TiO_2$ | 1.0 to 5.0 |
| $ZrO_2$ | 1.0 to 2.5 |
| $SnO_2$ | 0 to less than 1.0 |
| $\Sigma TiO_2 + ZrO_2 + SnO_2$ | 2.5 to 5.0 |
| $P_2O_5$ | 0 to 3.0 | said glass ceramic comprises colored glass ceramic;
said colored glass ceramic comprises a coloring agent;
said coloring agent comprises at least one compound of: V, Cr, Mn, Fe, Co, Cu, Ni, Se, and Cl; and
(II.) said glass ceramic comprises a composition, in weight % on an oxide basis, of:

| | |
|---|---|
| $Li_2O$ | 3.5 to 4.5 |
| $Na_2O$ | 0.2 to 1.0 |
| $K_2O$ | 0 to 0.8 |
| $\Sigma Na_2O + K_2O$ | 0.4 to 1.5 |
| MgO | 0.3 to 2.0 |
| CaO | 0 to 1.0 |
| SrO | 0 to 1.0 |
| BaO | 0 to 2.5 |
| ZnO | 0 to 1.0 |
| $Al_2O_3$ | 19 to 24 |
| $SiO_2$ | 60 to 68 |
| $TiO_2$ | 1.0 to 2.0 |
| $ZrO_2$ | 1.2 to 2.2 |
| $SnO_2$ | 0 to 0.6 |
| $\Sigma TiO_2 + ZrO_2 + SnO_2$ | 3.0 to 4.5 |
| $P_2O_5$ | 0 to 2.0 | said glass ceramic comprises colored glass ceramic;
said colored glass ceramic comprises a coloring agent;
said coloring agent comprises at least one compound of: V, Cr, Mn, Fe, Co, Cu, Ni, Se, and Cl;
(C.) said glass ceramic comprises:
the sum of 3.2 times the percentage of zinc oxide (ZnO) and the percentage of titanium dioxide ($TiO_2$) being equal to or less than 4.3 weight percent based on oxide;
(D.) said glass ceramic comprises less than 200 parts per billion of iron oxide ($Fe_2O_3$) and less than 2.5 weight percent of titanium dioxide ($TiO_2$), on an oxide basis to minimize coloration due to iron oxide and titanium dioxide upon vitrification;
said glass ceramic comprises glass ceramic is configured to have, at a thickness of 4 millimeters, light transmittances of one of:
more than 89%; and
more than 90%;
(E.) said glass ceramic being configured to have:
a coefficient of thermal expansion $\alpha_{20/300}$ between 3.5 and $5.0\times10^{-6}$/K;
a transformation temperature Tg between 600 and 750 degrees Celsius; and
a processing temperature $V_A$ below 1350 degrees Celsius;
(F.) said glass ceramic comprises keatite mixed crystals as the predominant crystal phase; and
said glass ceramic being configured to have a coefficient of thermal expansion of less than $1.5\times10^{-6}$/K; and
(G.) said glass ceramic comprises high quartz mixed crystals as the predominant crystal phase;
said glass ceramic being configured to have a coefficient of one of (a.) and (b.):
(a.) minus 0.3 to $0.3\times10^{-6}$/K; and
(b.) minus 0.15 to $0.15\times10^{-6}$/K; and
said glass ceramic being configured to have a light transmittance greater than 80%;
(vii) said glass ceramic window glazing unit comprises all of (A.), (B.), (C.), (D.), (E.), and (F.):
(A.) said glass ceramic comprises an aluminosilicate glass ceramic;
(B.) said glass ceramic comprises a composition, in weight % on an oxide basis, of:

| | |
|---|---|
| $Li_2O$ | 3.5 to 4.5 |
| $Na_2O$ | 0.2 to 1.0 |
| $K_2O$ | 0 to 0.8 |
| $\Sigma Na_2O + K_2O$ | 0.4 to 1.5 |
| MgO | 0.3 to 2.0 |
| CaO | 0 to 1.0 |
| SrO | 0 to 1.0 |
| BaO | 0 to 2.5 |
| ZnO | 0 to 1.0 |
| $Al_2O_3$ | 19 to 24 |
| $SiO_2$ | 60 to 68 |
| $TiO_2$ | 1.0 to 2.0 |
| $ZrO_2$ | 1.2 to 2.2 |
| $SnO_2$ | 0 to 0.6 |
| $\Sigma TiO_2 + ZrO_2 + SnO_2$ | 3.0 to 4.5 |
| $P_2O_5$ | 0 to 2.0 | said glass ceramic comprises colored glass ceramic;
said colored glass ceramic comprises a coloring agent;
said coloring agent comprises at least one compound of: V, Cr, Mn, Fe, Co, Cu, Ni, Se, and Cl;
(C.) said glass ceramic comprises:
the sum of 3.2 times the percentage of zinc oxide (ZnO) and the percentage of titanium dioxide ($TiO_2$) being equal to or less than 4.3 weight percent based on oxide;
(D.) said glass ceramic comprises less than 200 parts per billion of iron oxide ($Fe_2O_3$) and less than 2.5 weight percent of titanium dioxide ($TiO_2$), on an oxide basis to minimize coloration due to iron oxide and titanium dioxide upon vitrification;
said glass ceramic comprises glass ceramic is configured to have, at a thickness of 4 millimeters, light transmittances of one of:
more than 89%; and
more than 90%;
(E.) said glass ceramic being configured to have:
a coefficient of thermal expansion $\alpha_{20/300}$ between 3.5 and $5.0\times10^{-6}$/K;
a transformation temperature Tg between 600 and 750 degrees Celsius; and
a processing temperature $V_A$ below 1350 degrees Celsius;
(F.) one of (I.) and (II.):
(I.) said glass ceramic comprises keatite mixed crystals as the predominant crystal phase; and
said glass ceramic being configured to have a coefficient of thermal expansion of less than $1.5\times10^{-6}$/K; and
(II.) said glass ceramic comprises high quartz mixed crystals as the predominant crystal phase;
said glass ceramic being configured to have a coefficient of thermal expansion of one of (a.) and (b.):

(a.) minus 0.3 to 0.3×10⁻⁶/K; and
(b.) minus 0.15 to 0.15×10⁻⁶/K; and
said glass ceramic being configured to have a light transmittance greater than 80%; and
(viii) said glass ceramic window glazing unit is configured:
to permit said glass ceramic window glazing unit, upon being exposed an extreme adverse environment about a polar Arctic or Antarctic station in a polar Arctic or Antarctic region, to withstand thermomechanical stresses, due to extremes of temperature in a polar Arctic or Antarctic region, and due to changes of temperature in a polar Arctic or Antarctic region and from transitions of temperature at the exterior of said glass ceramic window glazing unit in a polar Arctic or Antarctic region about a polar Arctic or Antarctic station;
to permit said glass ceramic window glazing unit to withstand pressure differentials upon said glass ceramic window glazing unit in a polar Arctic or Antarctic region about a polar Arctic or Antarctic station;
to provide sufficient hardness and mechanical strength against impacts on said glass ceramic window glazing unit in a polar Arctic or Antarctic region about a polar Arctic or Antarctic station; and
to minimize distortions of views through said glass ceramic window glazing unit in a polar Arctic or Antarctic region; and
said glass ceramic window glazing unit is configured with a surface being configured to maximize ease of cleaning of the exterior surface of said at least one outer glass ceramic pane.

\* \* \* \* \*

UNITED STATES PATENT AND TRADEMARK OFFICE
CERTIFICATE OF CORRECTION

| | | |
|---|---|---|
| PATENT NO. | : 6,594,958 B2 | Page 1 of 1 |
| APPLICATION NO. | : 09/828287 | |
| DATED | : July 22, 2003 | |
| INVENTOR(S) | : Sabine Melson, Stefan Hubert and Thomas Karschti | |

It is certified that error appears in the above-identified patent and that said Letters Patent is hereby corrected as shown below:

On the title page, Section (75) Inventors:,
after "Karschti," delete "Burdenheim" and insert --Budenheim--.

On the title page, Section (56) References Cited: under "FOREIGN PATENT DOCUMENTS" add:

--Europe      0581610      2/1994
Europe        0524418      1/1993--.

In column 13, line 51, after "entitled", delete" "verglasung " and insert --"Verglasung--.

In column 24, line 15, Claim 6, before "and", delete "$_6$/K;" and insert --$^6$/K;--.

In column 31, line 58, Claim 20, begin a new paragraph with "(F.)".

In column 31, line 63, Claim 20, before "and", delete "$_6$/K;" and insert --$^6$/K;--.

In column 35, line 9, Claim 22, before "and", delete "$_6$/K;" and insert --$^6$/K;--.

In column 36, line 19, Claim 24, after "a" delete "polarArtic" and insert --polar Arctic--.

In column 38, line 63, Claim 24, before "and", delete "$_6$/K;" and insert --$^6$/K;--.

Signed and Sealed this

Tenth Day of October, 2006

JON W. DUDAS
*Director of the United States Patent and Trademark Office*